US012792216B2

(12) United States Patent
Wang

(10) Patent No.: US 12,792,216 B2
(45) Date of Patent: Nov. 10, 2026

(54) INFORMATION PROCESSING SYSTEM AND HOST

(71) Applicant: Kioxia Corporation, Tokyo (JP)

(72) Inventor: Yuquan Wang, Fujisawa Kanagawa (JP)

(73) Assignee: Kioxia Corporation, Tokyo (JP)

( * ) Notice: Subject to any disclaimer, the term of this patent is extended or adjusted under 35 U.S.C. 154(b) by 5 days.

(21) Appl. No.: 18/828,007

(22) Filed: Sep. 9, 2024

(65) Prior Publication Data

US 2025/0278192 A1 Sep. 4, 2025

(30) Foreign Application Priority Data

Mar. 1, 2024 (JP) ................................ 2024-031294

(51) Int. Cl.
*G06F 3/06* (2006.01)
*G06F 12/02* (2006.01)

(52) U.S. Cl.
CPC .......... *G06F 3/0611* (2013.01); *G06F 3/0659* (2013.01); *G06F 3/0679* (2013.01); *G06F 12/0253* (2013.01); *G06F 2212/7205* (2013.01)

(58) Field of Classification Search
CPC .... G06F 3/0611; G06F 3/0659; G06F 3/0679; G06F 12/0253; G06F 2212/7205
See application file for complete search history.

(56) References Cited

U.S. PATENT DOCUMENTS 11,256,620 B1 * 2/2022 Brandt ................ G06F 12/0802
2013/0073793 A1 3/2013 Yamagishi et al.
2013/0073798 A1 * 3/2013 Kang .................. G06F 12/0246 711/E12.008
2014/0195766 A1 * 7/2014 Taillefer .............. G06F 12/0261 711/170
2015/0186074 A1 * 7/2015 Benisty ................... G06F 3/061 711/170
2017/0177469 A1 * 6/2017 Hashimoto ......... G06F 12/0246
2017/0300410 A1 10/2017 Zhang et al.
2019/0180800 A1 6/2019 Kawano et al.
2020/0110540 A1 * 4/2020 Delaney ................ G06F 3/0659
2021/0011845 A1 1/2021 Huang
2021/0096772 A1 * 4/2021 Lee ....................... G06F 3/0652
2022/0050615 A1 2/2022 Teranishi et al.
(Continued)

FOREIGN PATENT DOCUMENTS

JP 2013077278 A 4/2013
JP 2019106056 A 6/2019
JP 2022032569 A 2/2022

*Primary Examiner* — Janice M. Girouard
(74) *Attorney, Agent, or Firm* — Maier & Maier, PLLC

(57) ABSTRACT

According to one embodiment, a nonvolatile memory in a storage device includes a swap area storing data that is not selected as an execution target of garbage collection (GC) triggered by a controller in the storage device, is written in a first write mode, and corresponds to a first tag in a write command received from a host. The host transmits, to the storage device, a first command to execute GC. The controller starts the GC in response to the first command received. The controller records progress of the GC in accordance with the GC in progress. The host transmits, to the storage device, a second command to confirm the progress. The controller notifies the host of the progress in response to the second command received.

22 Claims, 22 Drawing Sheets

(56) References Cited

U.S. PATENT DOCUMENTS

| | | | | |
|---|---|---|---|---|
| 2023/0082139 | A1 | 3/2023 | Hashimoto et al. | |
| 2023/0195362 | A1* | 6/2023 | Bi | G06F 3/0688 711/154 |
| 2023/0205460 | A1 | 6/2023 | Ishihara et al. | |

* cited by examiner

Garbage collection analysis command

| Item | Default | Content |
| --- | --- | --- |
| Specific area | User data area | Swap area, SLC area, TLC area, QLC area, start LBA + length |
| Group number | None designated | Swap data, hot data, warm data, cold data |
| GC mode | Normal GC | Normal GC, GC with FBO |

FIG. 9

Garbage collection execution command

| Item | Default | Content |
|---|---|---|
| Specific area | User data area | Swap area, SLC area, TLC area, QLC area, start LBA + length |
| Group number | None designated | Swap data, hot data, warm data, cold data |
| GC mode | Normal GC | Normal GC, GC with FBO |
| Execution timing | Immediate execution | Immediate execution, execution at next hibernation time |
| GC amount | Maximum GC applicable amount | Amount designated in read units (4KB) |
| GC destination write mode | TLC mode | SLC mode, TLC mode, QLC mode |
| GC destination temperature | Maintain GC source temperature | Hot data, warm data, cold data |

F I G. 10

Garbage collection restraint command

| Item | Default | Content |
|---|---|---|
| Specific area | User data area | Swap area, SLC area, TLC area, QLC area, start LBA + length |
| Group number | None designated | Swap data, hot data, warm data, cold data |
| Priority | 1 | Set priority of excluding from GC target in case where multiple GC restrained areas are set |

FIG. 11

INFORMATION PROCESSING SYSTEM AND HOST

CROSS-REFERENCE TO RELATED APPLICATIONS

This application is based upon and claims the benefit of priority from Japanese Patent Application No. 2024-031294, filed Mar. 1, 2024, the entire contents of which are incorporated herein by reference.

FIELD

Embodiments described herein relate generally to an information processing system and a host.

BACKGROUND

In recent years, storage devices that include a nonvolatile memory have been widely used. A storage device is connected to a host, for example. Data received from the host is written into the nonvolatile memory. The storage device executes garbage collection to improve fragmentation, etc., of data in a storage area of the nonvolatile memory.

BRIEF DESCRIPTION OF THE DRAWINGS

FIG. 9 is a diagram showing an example of items designated by a garbage collection analysis command that is used in the information processing system according to the embodiment.

FIG. 10 is a diagram showing an example of items designated by a garbage collection execution command that is used in the information processing system according to the embodiment.

FIG. 11 is a diagram showing an example of items designated by a garbage collection restriction command used in the information processing system according to the embodiment.

DETAILED DESCRIPTION

In general, according to one embodiment, an information processing system includes a host and a storage device. The storage device is connected to the host and is capable of communicating with the host, based on a universal flash storage (UFS) standard. The storage device includes a nonvolatile memory and a controller. The nonvolatile memory includes a plurality of memory cells each of which stores one or more bits of data. The controller writes, in a first write mode, one bit of data to each of the plurality of memory cells, and writes, in a second write mode, multiple bits of data to each of the plurality of memory cells. The controller manages a relationship between each of pieces of data stored in the nonvolatile memory and one of a plurality of tags each indicating a characteristic of data. The nonvolatile memory includes a swap area storing data that is not selected as an execution target of garbage collection triggered by the controller, is written in the first write mode, and corresponds to a first tag included in a write command received from the host. The host transmits, to the storage device, a first command to execute garbage collection. The controller starts the garbage collection in response to the first command received. The controller records progress of the garbage collection in accordance with the garbage collection in progress. The host transmits, to the storage device, a second command to confirm the progress. The controller notifies the host of the progress in response to the second command received.

Various embodiments will be described hereinafter with reference to the accompanying drawings.

The following assumes that a storage device of an information processing system according to an embodiment is implemented as a universal flash storage (UFS) device.

Figure 1:
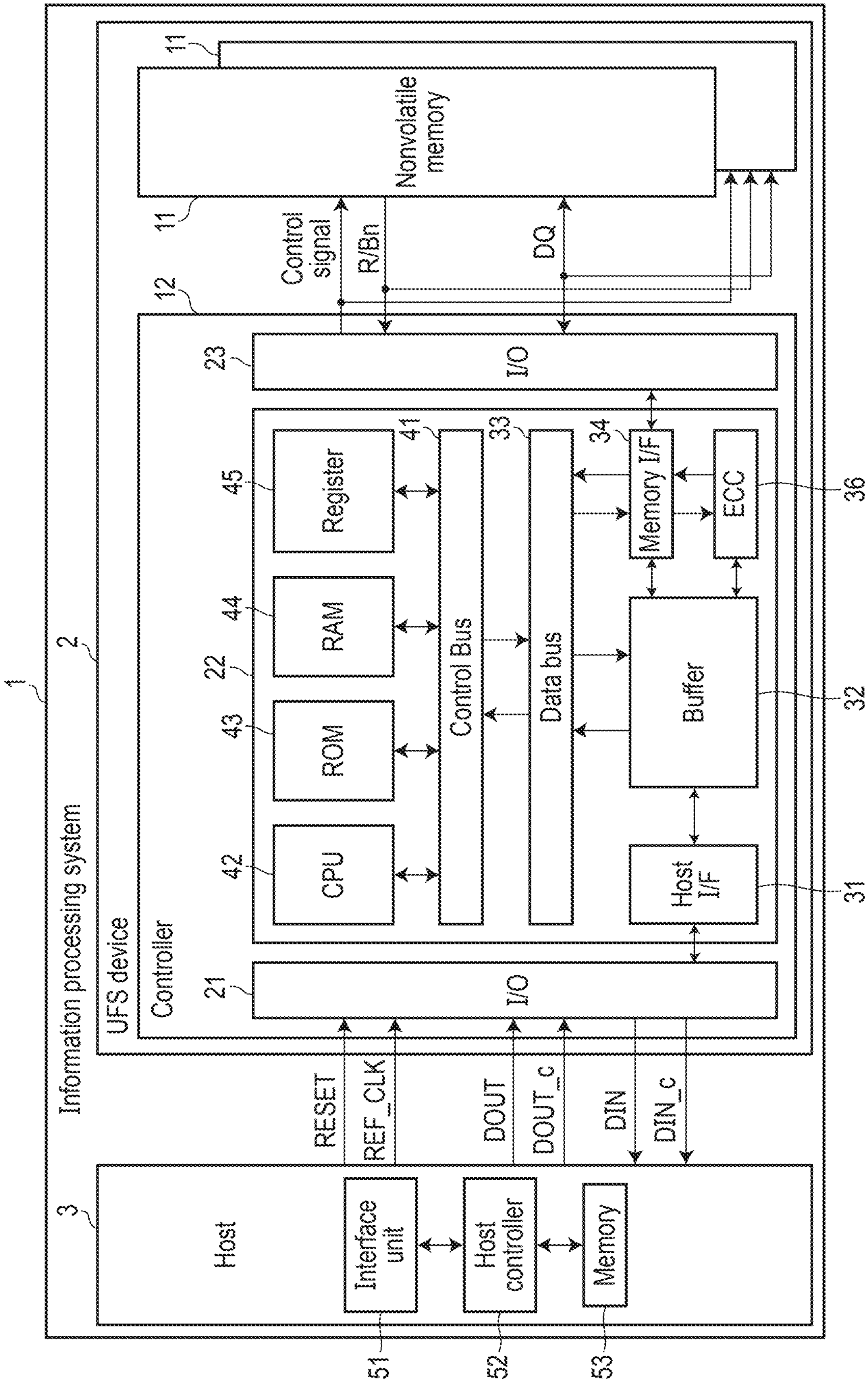
FIG. 1 is a block diagram showing an example of a configuration of an information processing system according to an embodiment.

FIG. 1 is a block diagram showing an example of a configuration of the information processing system 1 according to the embodiment. In FIG. 1, a part of connections between blocks is indicated by arrow lines; however, the connections between blocks are not limited thereto.

The information processing system 1 includes a UFS device 2 and a host (host device) 3. The UFS device 2 and the host 3 are connectable via a bus.

The UFS device 2 is a storage device that is connected to the host 3 and is capable of communicating with the host 3 on the basis of the UFS standard. The UFS device 2 includes at least one nonvolatile memory 11. The UFS device 2 writes data into the nonvolatile memory 11. The UFS device 2 reads data from the nonvolatile memory 11.

The host 3 is an information processing device. The host 3 is a device that supports the UFS device 2. The host 3 is, for example, a system-on-a-chip (SoC) device, and may be implemented as a device installed in a smartphone, a personal computer, a mobile terminal, or the like. The host 3 accesses the UFS device 2. Specifically, the host 3 transmits a write command, which is a command to write data, to the UFS device 2. The host 3 transmits a read command for reading data to the UFS device 2.

A communication between the UFS device 2 and the host 3 is executed via a bus. The bus is, for example, a bus that conforms to the Mobile Industry Processor Interface™ (MIPI™) standard. The communication between the UFS device 2 and the host 3 is carried out, for example, in accordance with an initiator/target method. In this case, the UFS device 2 is also referred to as a target. The host 3 is also referred to as an initiator. In the initiator/target method, the host 3 mainly transmits a command including an instruction to the UFS device 2, and the UFS device 2 transmits a response to the command received from the host 3. That is, the communication between the UFS device 2, which is the target, and the host 3, which is the initiator, is initiated by the host 3.

Next, a configuration of the UFS device 2 will be described. The UFS device 2 includes the nonvolatile memory 11 and a controller 12.

The nonvolatile memory 11 is a nonvolatile semiconductor memory. The nonvolatile memory 11 includes, for example, one or more NAND flash memories. The nonvolatile memory 11 is, for example, a flash memory with a two-dimensional structure or a three-dimensional structure. The nonvolatile memory 11 includes, for example, a memory cell array. The memory cell array includes a plurality of memory cells, each of which stores one or more bits of data.

The controller 12 is a memory controller that controls the nonvolatile memory 11. The controller 12 is electrically connected to the nonvolatile memory 11. The controller 12 performs writing of data into the nonvolatile memory 11 and reading of data from the nonvolatile memory 11. As a physical interface connecting the controller 12 and the nonvolatile memory 11, for example, a Toggle NAND interface or an open NAND flash interface (ONFI) is used. The function of each unit of the controller 12 may be realized by dedicated hardware, a processor executing a program, or a combination thereof. In addition, the controller 12 executes communication with the host 3.

The controller 12 includes an input/output (I/O) 21, a core logic unit 22, and an I/O 23.

The I/O 21 includes a hardware configuration for connecting the UFS device 2 to the host 3. Signals transmitted and received between the UFS device 2 and the host 3 include RESET, REF_CLK, DOUT, DOUT_C, DIN, and DIN_C. RESET, REF_CLK, DOUT, DOUT_C, DIN, and DIN_c are each transmitted and received between the host 3 and the UFS device 2 via the bus. RESET is a hardware reset signal. REF_CLK is a reference clock signal. DOUT and DOUT_c form a differential signal pair and are signals transmitted from the host 3 to the UFS device 2. DIN and DIN_c form a differential signal pair and are signals transmitted from the UFS device 2 to the host 3.

The core logic unit 22 is a main part of the components of the controller 12, excluding the I/O 21 and the I/O 23.

The I/O 23 includes a hardware configuration for connecting the controller 12 to the nonvolatile memory 11.

Next, a configuration of the core logic unit 22 will be described. The core logic unit 22 includes a host interface (I/F) 31, a buffer 32, a data bus 33, a memory interface (I/F) 34, an ECC circuit 36, a control bus 41, a central processing unit (CPU) 42, a read only memory (ROM) 43, a random access memory (RAM) 44, and a register 45.

The host I/F 31 is a hardware interface circuit. The host I/F 31 is connected to the I/O 21 and executes a process necessary for the UFS device 2 to communicate with the host 3. The host I/F 31 performs communication between the UFS device 2 and the host 3 in accordance with a communication protocol to which the UFS device 2 and the host 3 conform. For example, the host I/F 31 is a UFS interface that has a physical layer realized by M-PHY conforming to the MIPI standard and a link layer realized by UniPro conforming to the MIPI standard.

The buffer 32 is a volatile memory. The buffer 32 is realized by a RAM, such as a static RAM (SRAM) or a dynamic RAM (DRAM). The buffer 32 is connected to the host I/F 31, the data bus 33, the memory I/F 34, and the ECC circuit 36. The buffer 32 receives data transmitted from the host 3 to the UFS device 2 via the host I/F 31 and temporarily stores the data. In addition, the buffer 32 temporarily stores data to be transmitted from the controller 12 to the nonvolatile memory 11. The buffer 32 receives data transmitted from the nonvolatile memory 11 to the controller 12 via the memory I/F 34 and temporarily stores the data. In addition, the buffer 32 temporarily stores data to be transmitted from the UFS device 2 to the host 3.

The data bus 33 is a bus that performs transmitting and receiving data in the core logic unit 22.

The memory I/F 34 is a circuit that controls the nonvolatile memory 11. The memory I/F 34 is connected to the I/O 23 and executes a process necessary for the controller 12 to communicate with the nonvolatile memory 11. The memory I/F 34 transmits an instruction (control signal) from the core logic unit 22 to the nonvolatile memory 11 in a form that the nonvolatile memory 11 can recognize. Furthermore, the memory I/F 34 transmits and receives a signal DQ to and from the nonvolatile memory 11, and receives a ready/busy signal R/Bn from the nonvolatile memory 11. The signal DQ includes, for example, data, an address, and a command. The ready/busy signal R/Bn indicates whether the nonvolatile memory 11 is in a busy state or not.

The ECC circuit 36 is an error correction circuit. The ECC circuit 36 is connected to the memory I/F 34, the buffer 32, and the data bus 33. The ECC circuit 36 executes an encoding process to append an error correction code to data, based on an instruction from the memory I/F 34. Specifically, the ECC circuit 36 receives, via the data bus 33, data to be written received from the host 3 and appends an error correction code (hereinafter referred to as parity) to the data. The ECC circuit 36 transmits the data to which the parity is appended to the buffer 32. The ECC circuit 36 also executes a decoding process to execute error correction on data, based on an instruction from the memory I/F 34. Specifically, the ECC circuit 36 receives, via the buffer 32, data read from the nonvolatile memory 11 and executes error correction using a parity appended to the read data. The ECC circuit transmits the error corrected data to the data bus 33.

The control bus 41 is a bus that performs communication between components of the core logic unit 22. The CPU 42, the ROM 43, the RAM 44, and the register 45 are connected to the control bus 41. The CPU 42, the ROM 43, the RAM 44, and the register 45 communicate with each other via the control bus 41. In addition, the host I/F 31, the buffer 32, and the memory I/F 34 are connected to the control bus 41. The CPU 42 controls the host I/F 31, the buffer 32, and the memory I/F 34, based on a control program (firmware) and an instruction from the host 3.

The CPU 42 is a processor. The CPU 42 loads the firmware from the ROM 43 or the nonvolatile memory 11 to the RAM 44. The CPU 42 performs various processes by executing the firmware. Note that the firmware may be loaded to a DRAM (not illustrated) included in the UFS device 2.

The CPU 42 executes, as a flash translation layer (FTL), for example, management of data stored in the nonvolatile memory 11 and management of blocks included in the nonvolatile memory 11. The management of data stored in the nonvolatile memory 11 includes, for example, management of mapping information indicative of a relationship between each logical address and each physical address. The CPU 42 manages the mapping information by using a logical-to-physical translation (L2P) table described later. The management of blocks included in the nonvolatile memory 11 includes garbage collection, wear leveling, and management of defective blocks (bad blocks) included in the nonvolatile memory 11.

The ROM 43 is a nonvolatile memory. The ROM 43 stores the firmware, etc., executed by the CPU 42.

The RAM 44 is a volatile memory. The RAM 44 is used as a work area of the CPU 42 and temporarily stores variables, etc., necessary for the operation of the CPU 42.

The register 45 stores various values necessary for the operation of the UFS device 2. The register 45 also stores values necessary for the host 3 to control the UFS device 2.

Next, a configuration of the host 3 will be described. The host 3 includes an interface unit 51, a host controller 52, and a memory 53.

The interface unit 51 is a hardware interface circuit. The interface unit 51 performs communication between the host 3 and the UFS device 2 in accordance with the communication protocol to which the host 3 and the UFS device 2 conform.

The host controller 52 executes a process necessary for communication between the UFS device 2 and the host 3 through the interface unit 51. The process of the host controller 52 is realized by a processor. The processor is, for example, a central processing unit (CPU). The processor also executes software (host software) that is loaded to the memory 53. The host software is loaded to the memory 53 from the UFS device 2 or another storage device included in or connected to the host 3. The host software includes an operating system, a file system, device drivers, and application programs.

The memory 53 is, for example, a volatile memory. The memory 53 is also referred to as main memory, system memory, or host memory. The memory 53 is, for example, a random access memory such as a DRAM. A part of a storage area of the memory 53 is used as a data buffer. The data buffer stores write data to be written by the host controller 52 to the UFS device 2 or read data transferred from the UFS device 2.

Figure 2:
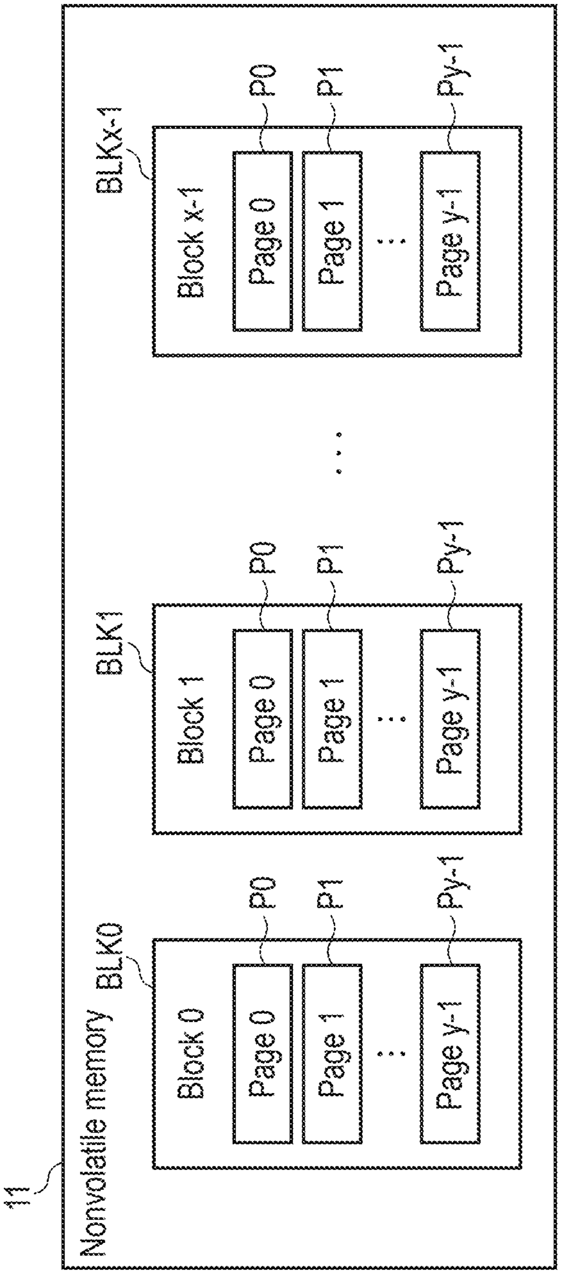
FIG. 2 is a block diagram showing an example of a configuration of a nonvolatile memory of a storage device according to the embodiment.

Next, an example of an internal configuration of the nonvolatile memory 11 will be described. FIG. 2 is a block diagram showing an example of a configuration of the nonvolatile memory 11 of the UFS device 2 according to the embodiment.

The nonvolatile memory 11 includes a plurality of blocks BLK0 to BLKx−1. Each of the blocks BLK0 to BLKx−1 functions as a unit of a data erase operation. Each of the blocks BLK0 to BLKx−1 is referred to as a physical block, a flash block, or a memory block.

Each of the blocks BLK0 to BLKx−1 includes pages P0 to Py−1. Each of the pages P0 to Py−1 is a unit of a data write operation and a data read operation. Each of the pages P0 to Py−1 includes, for example, a plurality of memory cells connected to a single word line.

Figure 3:
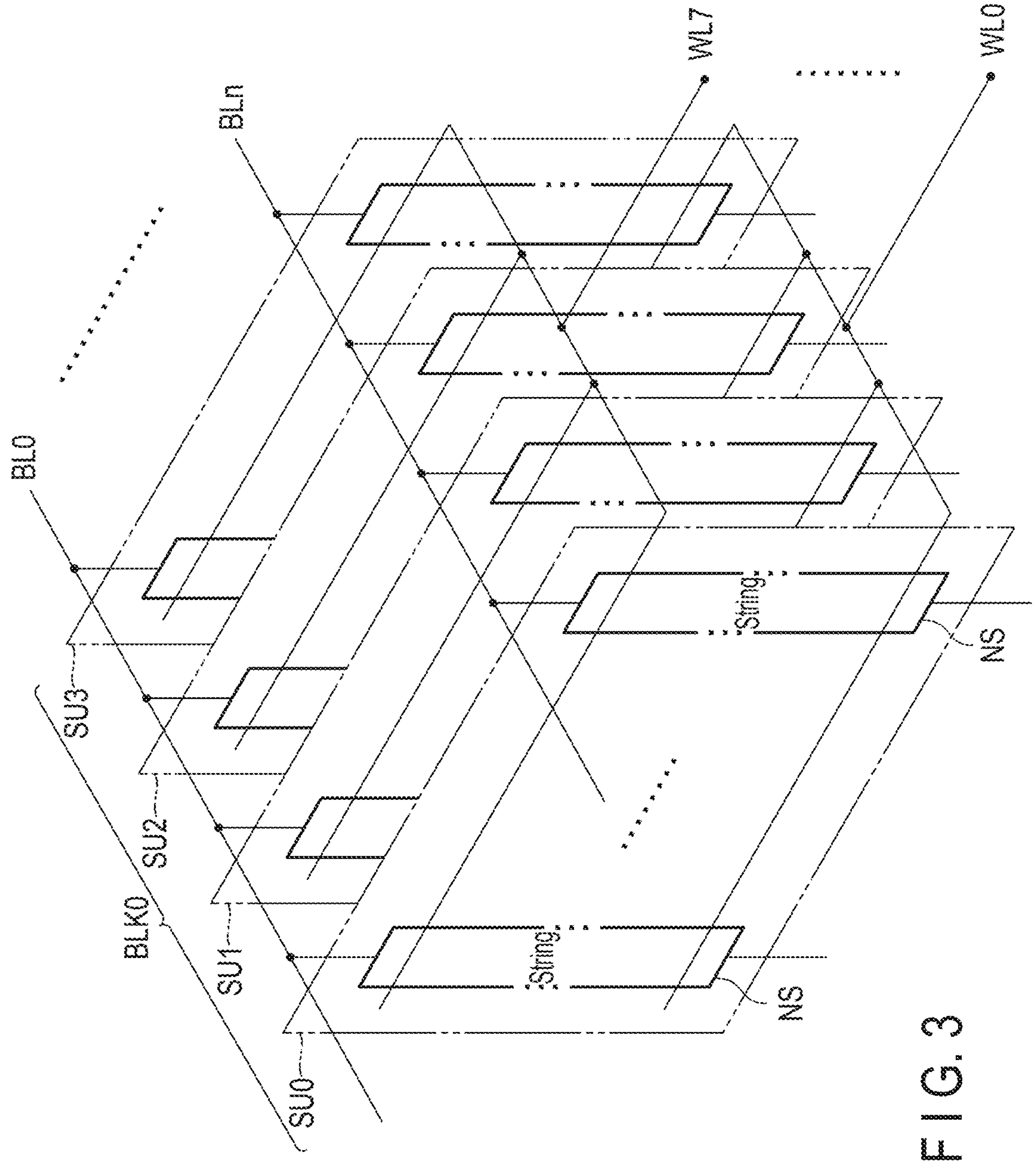
FIG. 3 is a diagram showing an example of a configuration of each of blocks that are included in a memory cell array of the nonvolatile memory according to the embodiment.

Next, an example of a configuration of a block will be described. FIG. 3 shows an example of a configuration of each of the plurality of blocks that are included in the memory cell array of the nonvolatile memory 11 according to the embodiment.

In FIG. 3, a configuration of a block is described with a focus on the block BLK0. The other blocks each have the same configuration as the block BLK0, for example. The block BLK0 includes four string units (SU0, SU1, SU2, and SU3). Note that the number of string units SU included in each block BLK is freely determined. The four string units (SU0, SU1, SU2, and SU3) are arranged in a direction (horizontal direction) orthogonal to a direction in which a plurality of word lines WL0 to WL7 are stacked (vertical direction). Each string unit SU includes a plurality of strings NS. One end of each string NS is connected to a corresponding bit line among a plurality of bit lines (BL0 to BLn). Each string NS extends in the vertical direction. Control gates of a plurality of memory cell transistors in each string NS are connected to the plurality of word lines (WL0, WL1, . . . , WL7), respectively.

Figure 4:
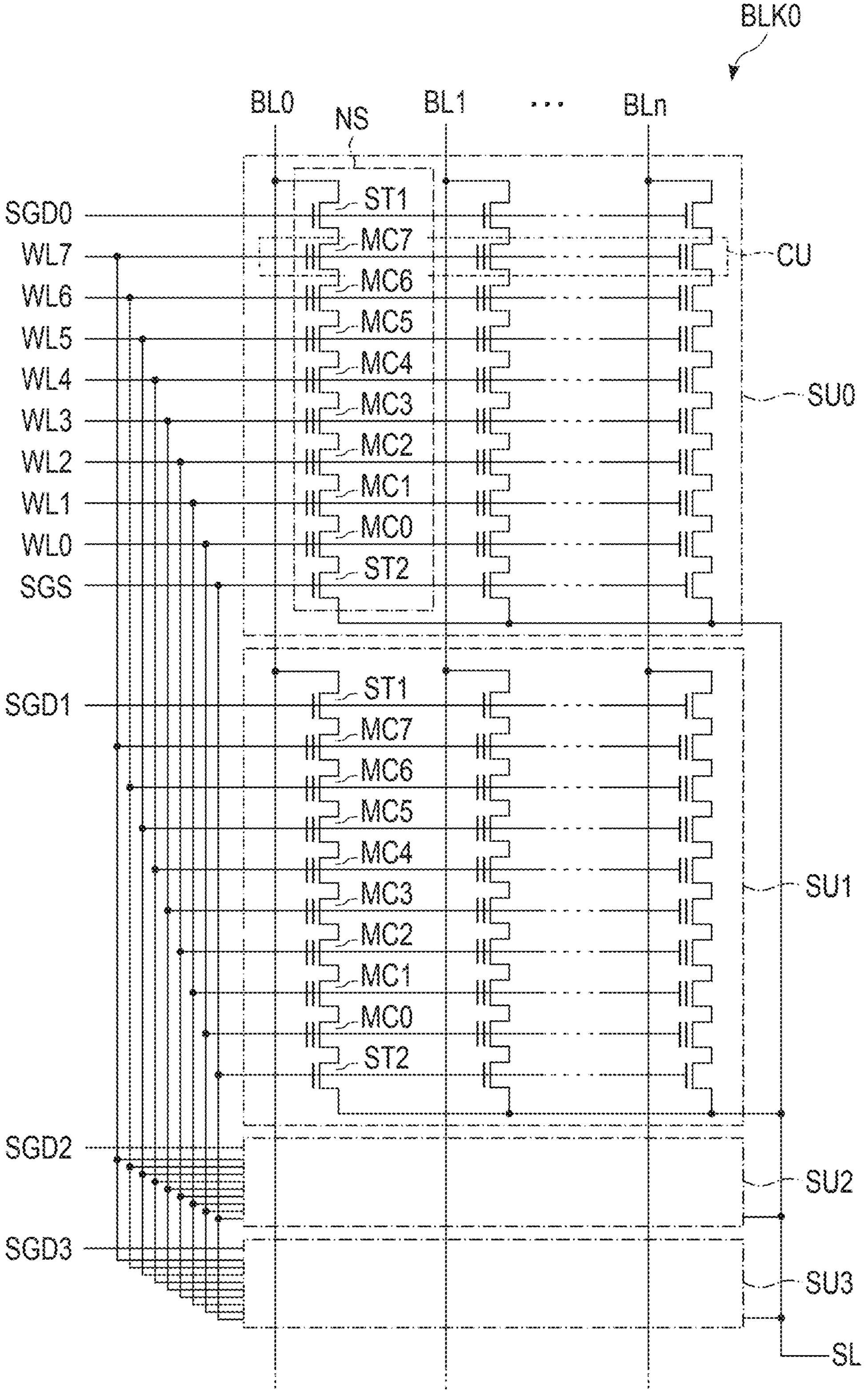
FIG. 4 is a diagram showing an example of a circuit configuration of a block included in the nonvolatile memory according to the embodiment.

Next, a circuit configuration of the block will be described. FIG. 4 shows an example of the circuit configuration of the block of the nonvolatile memory 11 according to the embodiment. FIG. 4 depicts a planar view of the example of the configuration of the block shown in FIG. 3.

A string unit SU is, for example, a set of strings NS that are collectively selected in a program operation or a read operation. Each string unit SU includes a plurality of strings NS.

Each string NS is a set of memory cells MC that are connected in series. The plurality of strings NS in a string unit SU are connected to one of the bit lines BL0 to BLn (n is an integer of one or more). Each string NS includes a plurality of memory cells MC and select transistors ST1 and ST2. In the example in FIG. 4, the string NS includes eight memory cells MC0 to MC7 and two select transistors ST1 and ST2. Note that the number of memory cells MC in a string NS is not limited to eight.

A memory cell MC is a memory element that stores data in a non-volatile manner. The memory cell MC includes a control gate and a charge storage layer. The memory cell MC may be a metal-oxide-nitride-oxide-silicon (MONOS) type or may be a floating gate (FG) type. The MONOS type uses an insulating layer in the charge storage layer. The FG type uses a conductive layer in the charge storage layer.

The select transistors ST1 and ST2 are switching elements. The select transistors ST1 and ST2 are used to select a string unit SU in various operations.

A gate of each select transistor ST1 of the string unit SU0 is connected to a select gate line SGD0 corresponding to the string unit SU0. A gate of each select transistor ST1 of the string unit SU1 is connected to a select gate line SGD1 corresponding to string unit SU1. A gate of each select transistor ST1 of string unit SU2 is connected to a select gate line SGD2 corresponding to the string unit SU2. A gate of each select transistor ST1 of the string unit SU3 is connected to a select gate line SGD3 corresponding to the string unit SU3. In contrast, gates of select transistors ST2 of the string units SU0 to SU3 are commonly connected to a select gate line SGS. Note that the gates of the select transistors ST2 of the string units SU0 to SU3 may be connected to different select gate lines for each string unit. Control gates of memory cells MC0 to MC7 in a block BLK are commonly connected to word lines WL0 to WL7, respectively.

Program and read operations in the nonvolatile memory 11 may be executed collectively for a plurality of memory cells MC in a single string unit SU that are connected to a single word line. The set of memory cells MC that are collectively selected for the program and read operations is referred to as a memory cell group MG. The memory cell group MG is the unit of program and read operations and is treated as a storage location. In a case where each memory cell MC is configured to store 1-bit data, the size of data stored per memory cell group MG is referred to as a page. In a case where each memory cell MC is configured to store 3-bit data, the size of data stored per memory cell group MG is three pages. In a case where each memory cell MC is configured to store 4-bit data, the size of data stored per memory cell group MG is four pages.

Figure 5:
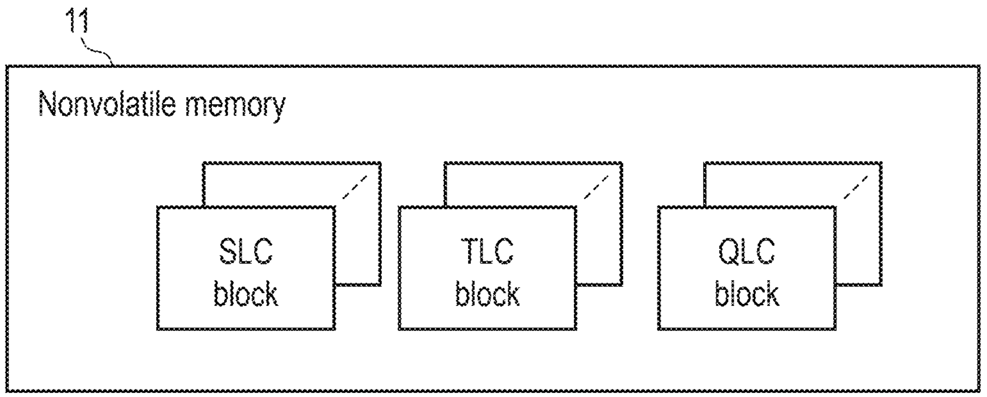
FIG. 5 is a diagram showing an example of blocks included in the nonvolatile memory according to the embodiment.

Next, a plurality of blocks will be described. FIG. 5 shows an example of a plurality of blocks included in the nonvolatile memory 11 according to the embodiment.

The plurality of blocks include a plurality of single-level cell (SLC) blocks, a plurality of triple-level cell (TLC) blocks, and a plurality of quadruple-level cell (QLC) blocks.

Each of the plurality of SLC blocks is a block for which a program operation is executed in a write mode in which 1-bit data is stored per memory cell (SLC mode). The SLC blocks may also be realized by pSLC blocks. Each of the pSLC blocks is a block that is capable of storing two or more bits of data per memory cell, but are used as an SLC block that store one bit of data per memory cell. The time required to write data to and read data from an SLC block is shorter than the time required to write data to and read data from a block that stores two or more bits of data per memory cell. For example, once a block has been used as an SLC block, writing of data to the block will no longer be executed in a write mode other than the SLC mode.

For example, the SLC block is preferentially allocated as a write destination block in a case where a write booster mode is ON in a write mode between the host 3 and the UFS device 2.

The write booster mode is set to ON between the host 3 and the UFS device 2, for example, in a case where it is desired that data be written/read at high speed.

In a case where swap data is associated with a write command received from the host 3, the UFS device 2 specifies an SLC block as the write destination block. The swap data is data that is to be stored in the memory 53 of the host 3 and is temporarily stored in a storage area of the UFS device 2. That is, the swap data is data that is stored in the storage area of the UFS device 2, which is used as an expansion area of the memory 53. The write command associated with the swap data includes a group number representing the swap data. The group number is a tag that is associated with corresponding data and represents a characteristic of the data. The characteristic of data includes, for example, swap data, hot data, warm data, and cold data. The hot data is data that is accessed more frequently by the host 3 than the warm data and the cold data. The cold data is data that is accessed less frequently by the host 3 than the hot data and the warm data. In addition, a group number corresponding to swap data may represent whether the swap data is swap hot data or swap cold data. The relationship between the data and the group number may be managed by the controller 12.

Each of the plurality of TLC blocks is a block for which a program operation is executed in a write mode in which 3-bit data is stored per memory cell (TLC mode). The time required to write data to and read data from a TLC block is longer than the time required to write data to and read data from an SLC block and shorter than the time required to write data to and read data from a QLC block.

The TLC block is allocated as the write destination block, for example, in a case where the write mode between the host 3 and the UFS device 2 is a normal mode, i.e., in a case where the write booster mode is OFF. The TLC block is also allocated as the write destination block in a case where the write booster mode is ON and there is no SLC block available as the write destination block. The TLC block may also be used as a data copy destination block in the garbage collection. For example, in the garbage collection, warm data and cold data are moved to the TLC block.

Each of the plurality of QLC blocks is a block for which a program operation is executed in a write mode in which 4-bit data is stored per memory cell (QLC mode). The time required to write data to and read data from a QLC block is longer than the time required to write data to and read data from a block that stores three or less bits of data per memory cell.

The QLC block may be used, for example, as the data copy destination block in the garbage collection. For example, in the garbage collection, cold data is moved to the QLC block.

Although FIG. 5 shows a case where the nonvolatile memory 11 includes the plurality of SLC blocks, the plurality of TLC blocks, and the plurality of QLC blocks, the nonvolatile memory 11 may include only the plurality of SLC blocks and the plurality of TLC blocks. Alternatively, the nonvolatile memory 11 may include only the plurality of SLC blocks and the plurality of QLC blocks. Furthermore, instead of the SLC blocks, the TLC blocks, and the QLC blocks, MLC blocks in which 2-bit data is written per memory cell may be used.

Figure 6:
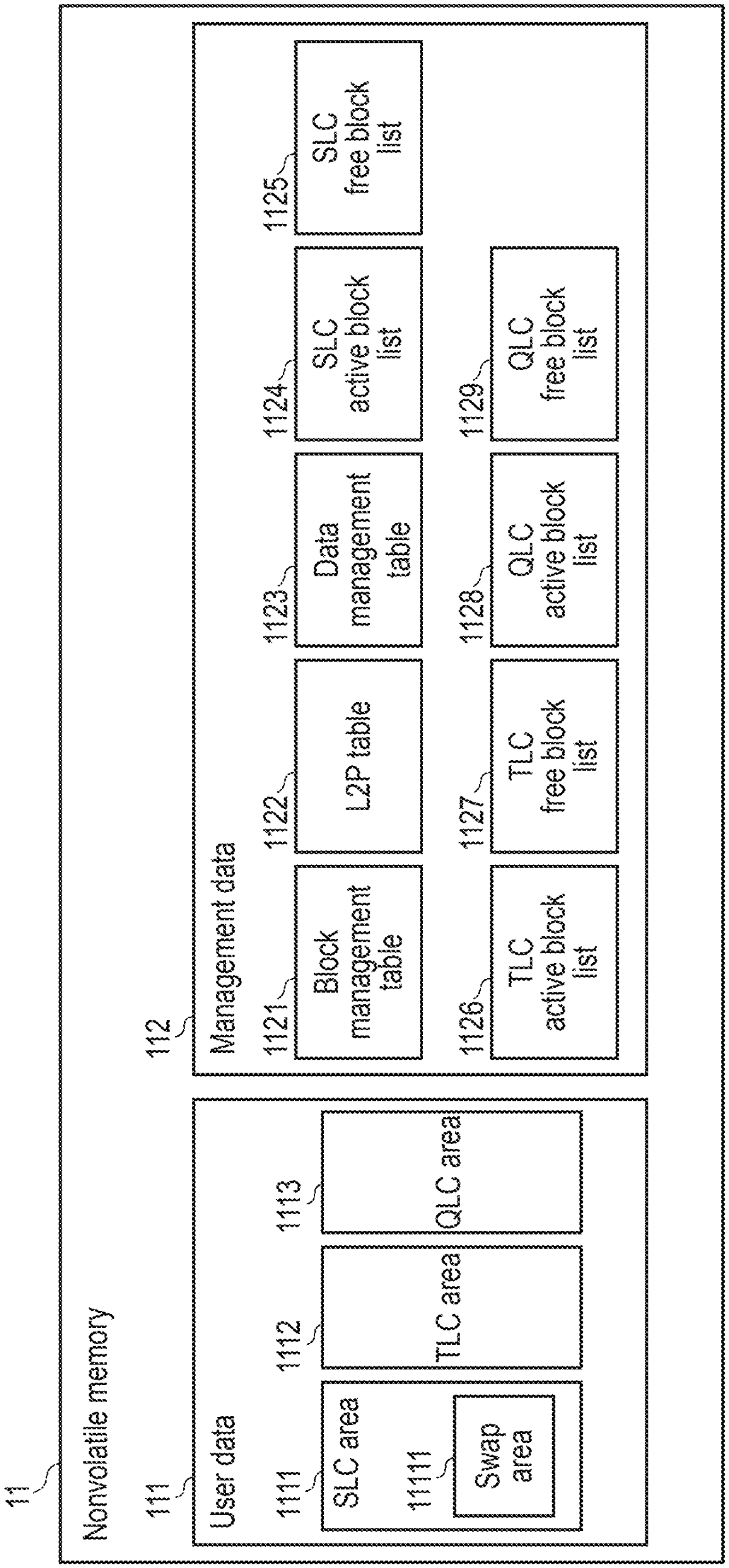
FIG. 6 is a diagram showing an example of storage areas in the nonvolatile memory according to the embodiment.

Next, storage areas in the nonvolatile memory 11 will be described. FIG. 6 shows an example of the storage areas in the nonvolatile memory 11 according to the embodiment.

The nonvolatile memory 11 includes a storage area that stores user data 111 and a storage area that stores management data 112. The user data 111 is data received from the host 3. The management data 112 is data used for management of the UFS device 2. The management data 112 is also referred to as system data.

The area that stores the user data 111 includes an SLC area 1111, a TLC area 1112, and a QLC area 1113.

The SLC area 1111 is a storage area that corresponds to the plurality of SLC blocks.

The TLC area 1112 is a storage area that corresponds to the plurality of TLC blocks.

The QLC area 1113 is a storage area that corresponds to the plurality of QLC blocks.

The SLC area 1111 includes a swap area 11111. The swap area 11111 is a storage area used for storing swap data. For example, the swap area 11111 is a storage area storing swap data. The swap data is data corresponding to a tag indicative of swap data. In execution of the garbage collection triggered by the UFS device 2 without an instruction from the host 3, the swap data may be controlled so that it is not selected as data of a target of the garbage collection. Since the swap area 11111 is included in the SLC area 1111, the swap data is data that is written into the nonvolatile memory 11 in the SLC mode.

The management data 112 includes a block management table 1121, an L2P table 1122, a data management table 1123, an SLC active block list 1124, an SLC free block list 1125, a TLC active block list 1126, a TLC free block list 1127, a QLC active block list 1128, and a QLC free block list 1129.

The block management table 1121 is a table used for managing a plurality of blocks included in the nonvolatile memory 11. For example, the block management table 1121 manages a write mode in which data is written into each of the plurality of blocks. That is, the block management table 1121 includes information indicating whether each of the plurality of blocks is an SLC block, a TLC block, or a QLC block. The block management table 1121 may further include information indicative of defective blocks.

The L2P table 1122 is a table used for managing mapping information. Data stored in a storage location indicated by a physical address that has a relationship with a logical address in the L2P table 1122, is referred to as valid data. That is, valid data is accessible by the host 3. Data stored in a storage location indicated by a physical address that is not associated with a logical address in the L2P table 1122, is referred to as invalid data. The invalid data is data that has no possibility of being accessed by the host 3.

The data management table 1123 is a table that manages characteristics of pieces of data stored in the nonvolatile memory 11. Specifically, the data management table 1123 manages a relationship between data (a piece of data) stored in the nonvolatile memory 11 and a group number (tag) that represents a characteristic of the data. The characteristic of the data includes, for example, a temperature of the data. The temperature of the data corresponds to a frequency with which the data is accessed. Data that is accessed with a high frequency is referred to as hot data. Data that is accessed with a low frequency is referred to as cold data. Data that is accessed with a frequency somewhere between the hot data and the cold data is referred to as warm data. Furthermore, the characteristic of the data includes information indicating whether the data is swap data or not. That is, the group number represents the temperature of the corresponding data and whether the data is swap data or not.

The SLC active block list 1124 is a list that manages active blocks among the SLC blocks. Each of the active blocks is a block that stores at least valid data.

The SLC free block list 1125 is a list that manages free blocks among the SLC blocks. Each of the free blocks is a block that stores no valid data. Each of the blocks managed in the SLC free block list 1125 is a block to be newly allocated as a write destination block into which data is written in the SLC mode.

The TLC active block list 1126 is a list that manages active blocks among the TLC blocks.

The TLC free block list 1127 is a list that manages free blocks among the TLC blocks. Each of the blocks managed in the TLC free block list 1127 is a block to be newly allocated as a write destination block into which data is written in the TLC mode.

The QLC active block list 1128 is a list that manages active blocks among the QLC blocks.

The QLC free block list 1129 is a list that manages free blocks among the QLC blocks. Each of the blocks managed in the QLC free block list 1129 is a block to be newly allocated as a write destination block into which data is written in the QLC mode. Note that a common free block list that manages free blocks may be used, instead of the SLC free block list 1125, the TLC free block list 1127, and the QLC free block list 1129 each managing a part of the free blocks separately. In that case, the number of blocks managed in the common free block list increases or decreases in accordance with increase or decrease in the number of blocks in each of the SLC active block list 1124, the TLC active block list 1126, and the QLC active list 1128.

Figure 7:
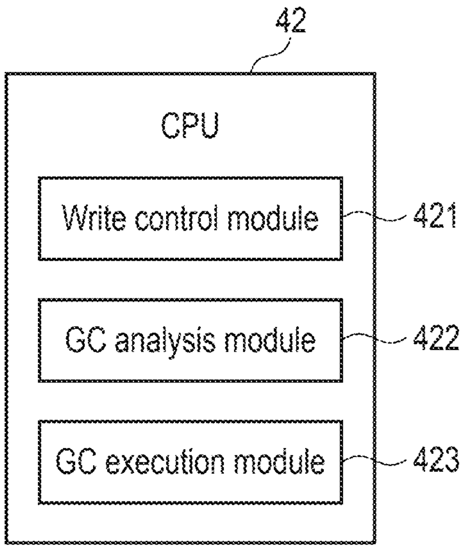
FIG. 7 is a diagram showing an example of a functional configuration of a CPU of the storage device according to the embodiment.

Next, functions of the CPU 42 will be described. FIG. 7 shows an example of a functional configuration of the CPU 42 of the UFS device 2 according to the embodiment. The CPU 42 includes a write control module 421, a garbage collection (GC) analysis module 422, and a garbage collection (GC) execution module 423. Some or all of the modules in the CPU 42 may be realized by other hardware in the controller 12.

In the garbage collection, the CPU 42 selects only pieces of valid data among pieces of data stored in a garbage collection (GC) target block. Then, the CPU 42 copies only the selected pieces of valid data to a garbage collection (GC) destination block. When the CPU 42 has copied the pieces of valid data, all the pieces of valid data stored in the GC target block become pieces of invalid data and then the GC target block becomes a free block. Thus, the CPU 42 can generate a free block. For example, the CPU 42 starts the garbage collection in a case where the number of free blocks in the storage device decreases. At this time, the CPU 42, for example, preferentially selects, as the GC target block, a block with a low ratio of valid data among the active blocks. Note that, in the present embodiment, even in a case where data is not fragmented, moving data from an SLC block to another SLC block, from an SLC block to a TLC block, from an SLC block to a QLC block, from a TLC block to an SLC block, from a TLC block to another TLC block, from a TLC block to a QLC block, from a QLC block to an SLC block, from a QLC block to a TLC block, and from a QLC block to another QLC block is also called garbage collection. In such data movement, only a part of data stored in an original block may be moved to another block. In this case, the remaining part of the data is maintained in the original block before and after the data movement.

The write control module 421 executes a write process of data to the nonvolatile memory 11. The write control module 421 executes the write process based on a write command received from the host 3. The write command is associated with data to be written into the nonvolatile memory 11. The write command includes a start LBA, a length, and a group number. The start LBA is a first LBA of a plurality of LBAs that correspond to the data associated with the write command. The length indicates the number of the LBAs that correspond to the data associated with the write command. The length corresponds to the size of the data associated with the write command. The group number is a tag that corresponds to the characteristic of the data associated with the write command. The write control module 421 may, for example, perform control so that pieces of data that have different characteristics are not mixed in one block. In this case, the write control module 421 performs control so that pieces of data with different group numbers are written in different blocks, respectively.

When having received the write command, the write control module 421 determines a storage location into which the data associated with the write command is to be written. Then, the write control module 421 updates the L2P table 1122 so that a physical address indicative of the determined storage location is mapped to the LBAs designated by the write command. In addition, instead of the write control module 421 determining the storage location into which the data is to be written, the write control module 421 may receive a physical address indicative of a storage location into which the data has been written from the nonvolatile memory 11, and update the L2P table 1122 with the received physical address.

Here, the write control module 421 determines the storage location into which the data is to be written on the basis of the write mode between the UFS device 2 and the host 3 and the group number designated by the write command. For example, in a case where the write booster mode is ON and a storage area in the SLC area 1111 to store the data associated with the write command can be allocated, the write control module 421 determines the storage location in the SLC area 1111 as a write destination of the data. In a case where the write booster mode is not ON, the write control module 421 determines a storage location in the TLC area 1112 as the write destination of the data. Furthermore, in a case where the group number represents swap data, the write control module 421 determines a storage location in the SLC area 1111 as the write destination of the data.

The write control module 421 updates the data management table 1123 so that the data associated with the received write command corresponds to the group number designated by the write command.

The GC analysis module 422 executes a GC analysis process. The GC analysis module 422 executes the GC analysis process in response to receiving a garbage collection (GC) analysis command from the host 3. The GC analysis command is a command to execute an analysis relating to garbage collection. The GC analysis command is, for example, a type of command UPIU. The details of the GC analysis command are described later with reference to FIG. 9. The GC analysis module 422 generates the results of the analysis that include a dirty status of target storage areas of the garbage collection and a total size of data to be copied when the garbage collection is executed. The dirty status indicates a ratio of storage areas from which data is to be copied according to the garbage collection to storage areas analyzed based on the GC analysis command. The total size of data to be copied when the garbage collection is executed indicates the total size of valid data stored in the target storage areas of the garbage collection among the storage areas analyzed based on the GC analysis command.

For example, the GC analysis module 422 updates attribute information (attributes) to indicate that the analysis has been completed and the generated results of the analysis. The attribute information is information that indicates attributes of the UFS device 2, and is handled between the host 3 and the UFS device 2.

In response to receiving a command from the host 3 to obtain the results of the analysis, the GC analysis module 422 notifies the host 3 of the results of the analysis. Specifically, in response to receiving a command to obtain the attribute information (QUERY REQUEST UPIU), the GC analysis module 422 transmits the attribute information to the host 3. The host 3 thereby obtains the information indicating that the analysis has been completed and the results of the analysis that are included in the attribute information. On the basis of the obtained results of the analysis, the host 3 transmits a garbage collection execution command to the UFS device 2.

The GC execution module 423 executes garbage collection. The GC execution module 423 executes the garbage collection in response to receiving the garbage collection execution command from the host 3. The garbage collection (GC) execution command is, for example, a type of command UPIU. The GC execution module 423 executes the garbage collection based on information designated by the GC execution command. Details of the GC execution command will be described later with reference to FIG. 10.

The GC execution module 423 executes the garbage collection in which valid data stored in target storage areas of the garbage collection determined based on the GC execution command is copied to another storage area.

In addition, there is a case where a garbage collection (GC) restriction command received from the host 3 designates a specific area or a tag indicative of a characteristic of data. In this case, the GC execution module 423 executes the garbage collection so that in a case where valid data stored in the target storage areas of the garbage collection corresponds to data determined based on the GC restriction command, the valid data is not copied to another storage area.

While executing the garbage collection, the GC execution module 423 records the progress of the garbage collection. The progress of the garbage collection is, for example, a ratio of data that has already been copied to the size of data to be copied in the current garbage collection. For example, as the garbage collection progresses, the GC execution module 423 updates the attribute information with the progress of the garbage collection. The GC execution module 423 transmits the attribute information to the host 3 in response to receiving a command to obtain information on the progress of the garbage collection (QUERY REQUEST UPIU).

Furthermore, in response to receiving a garbage collection abort command from the host 3, the GC execution module 423 aborts the garbage collection that is currently being executed (i.e., the garbage collection in progress). When having aborted the garbage collection, the GC execution module 423 updates the attribute information with information indicating that the garbage collection has been aborted. The GC execution module 423 transmits the attribute information to the host 3 in response to receiving a command for confirming that the garbage collection has been aborted (QUERY REQUEST UPIU).

Next, block management in the UFS device 2 will be described.

The controller 12 writes data into an SLC write destination block in the SLC mode. For example, when the write booster is ON or when swap data or hot data is written, the controller 12 executes data writing in the SLC mode. When there is no more writeable storage area in the SLC write destination block, the controller 12 selects a free block from the SLC free block list 1125, newly allocates it to the SLC write destination block, and writes data. When the writing has been completed, the block to which the writing has been completed is deallocated from the write destination block. The block allocated as the SLC write destination block is added to (registered in) the SLC active block list 1124.

When a block that stores only invalid data has occurred among the blocks registered in the SLC active block list 1124, the block is released from the SLC active block list 1124 and is registered in the SLC free block list 1125.

Furthermore, when the garbage collection for the SLC area 1111 has been started, the controller 12 selects a block from the SLC active block list 1124 and allocates the block as a GC target block. For example, the controller 12 preferentially allocates a block with a low ratio of valid data as the GC target block, among the blocks registered in the SLC active block list 1124.

In the garbage collection, the controller 12 selects the write mode in which data is to be copied, based on the characteristic of the data after being copied. For example, in a case where the SLC mode is selected, the controller 12 selects an SLC block as a destination of the GC (i.e., selects a GC destination SLC block). Then, when the garbage collection has been completed, the controller 12 registers, in the SLC free block list 1125, the GC target block that no longer includes valid data. When the copying of data to the GC destination SLC block has been completed, this GC destination SLC block is registered in the SLC active block list 1124.

For example, in a case where the TLC mode is selected, the controller 12 selects a TLC block as the destination of the GC (i.e., selects a GC destination TLC block). When there is no more writeable storage area in the TLC write destination block, the controller 12 selects a free block from the TLC free block list 1127, newly allocates it to the TLC write destination block, and writes data. When the writing has been completed, the block to which the writing has been completed is deallocated from the write destination block. The block allocated to the TLC write destination is added to (registered in) the TLC active block list 1126.

For example, in a case where the QLC mode is selected, the controller 12 selects a QLC block as the destination of the GC (i.e., selects a GC destination QLC block). When there is no more writeable storage area in the QLC write destination block, the controller 12 selects a free block from the QLC free block list 1129, newly allocates it to the QLC write destination block, and writes data. When the writing has been completed, the block to which the writing has been completed is deallocated from the write destination block. The block allocated to the QLC write destination is added to (registered in) the QLC active block list 1128.

Next, data writing in the TLC mode will be described.

The controller 12 writes data to a TLC write destination block in the TLC mode. For example, when the write booster is OFF or when warm data or cold data is written, the controller 12 executes data writing in the TLC mode. When there is no more writeable storage area in the TLC write destination block, the controller 12 selects a free block from the TLC free block list 1127, newly allocates it to the TLC write destination block, and writes data. When the writing has been completed, the block to which the writing has been completed is deallocated from the write destination block. The block allocated to the TLC write destination is added to (registered in) the TLC active block list 1126.

When a block that stores only invalid data has occurred among the blocks registered in the TLC active block list 1126, the block is registered in the TLC free block list 1127.

Furthermore, when the garbage collection for the TLC area 1112 has been started, the controller 12 selects a TLC write destination block, and may select a block from the TLC active block list 1126 and allocate the block as a GC target block. For example, the controller 12 may preferentially allocate a block with a low ratio of valid data as the GC target block, among the blocks registered in the TLC active block list 1126.

In the garbage collection, the controller 12 selects the write mode in which data is to be copied, based on the characteristic of the data after being copied. Then, the controller 12 selects one of a GC destination SLC block, a GC destination TLC block, and a GC destination QLC block as a GC destination block in accordance with the selected write mode. When the garbage collection has been completed, the controller 12 registers, in the TLC free block list 1127, the GC target block that no longer includes valid data.

The case in which the data writing based on a write command is executed in the SLC mode or in the TLC mode is described above; however, data writing based on a write command may also be executed in the QLC mode. In this case, the controller 12 uses a QLC block selected from the QLC free block list 1129 as a QLC write destination block. As data to be written into the QLC write destination block in the QLC mode, for example, cold data is associated with the write command.

Furthermore, although the garbage collection in which the GC target block is selected from the SLC active block list 1124 or the TLC active block list 1126 is described above, a block may be selected from the QLC active block list 1128 and allocated as the GC target block on the basis of the target storage areas of the garbage collection. A block that no longer includes valid data through the garbage collection is registered in the QLC free block list 1129.

The above block management will be described with reference to flowcharts in FIG. 8A to FIG. 8C.

Figure 8A:
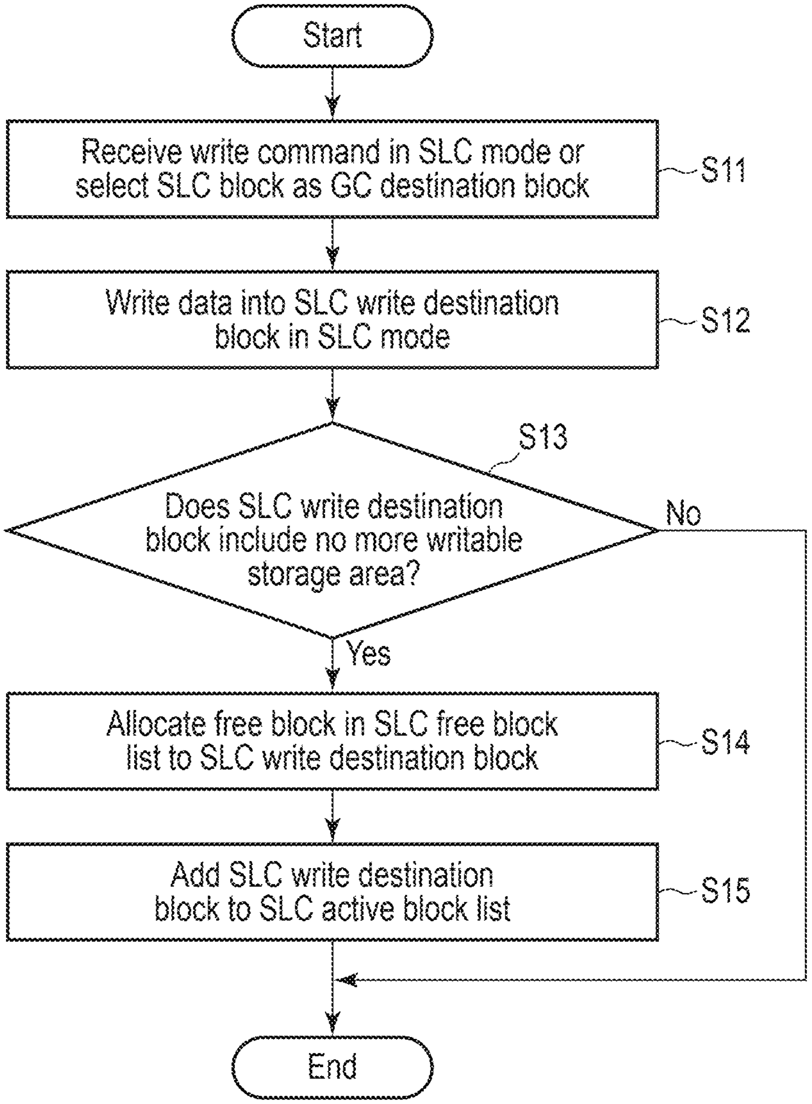
FIG. 8A is a flowchart showing the procedure of data writing to an SLC block executed in the storage device according to the embodiment.

FIG. 8A is a flowchart showing the procedure of data writing to an SLC block executed in the storage device according to the embodiment.

First, the controller 12 receives a write command in the SLC mode or selects an SLC block as a GC destination block in garbage collection (step S11).

The controller 12 writes data into an SLC write destination block (or the GC destination SLC block) in the SLC mode (step S12).

The controller 12 determines whether the SLC write destination block includes no more storage area available to write data (step S13).

When the SLC write destination block includes no more writeable storage area (Yes in S13), the controller 12 selects an SLC free block from the SLC free block list 1125 and allocates it as the SLC write destination block (step S14).

Then, the controller 12 adds the block allocated as the SLC write destination block to the SLC active block list 1124 (step S15).

When the SLC write destination block still includes a writeable storage area (No in S13), the controller 12 ends the data writing.

Figure 8B:
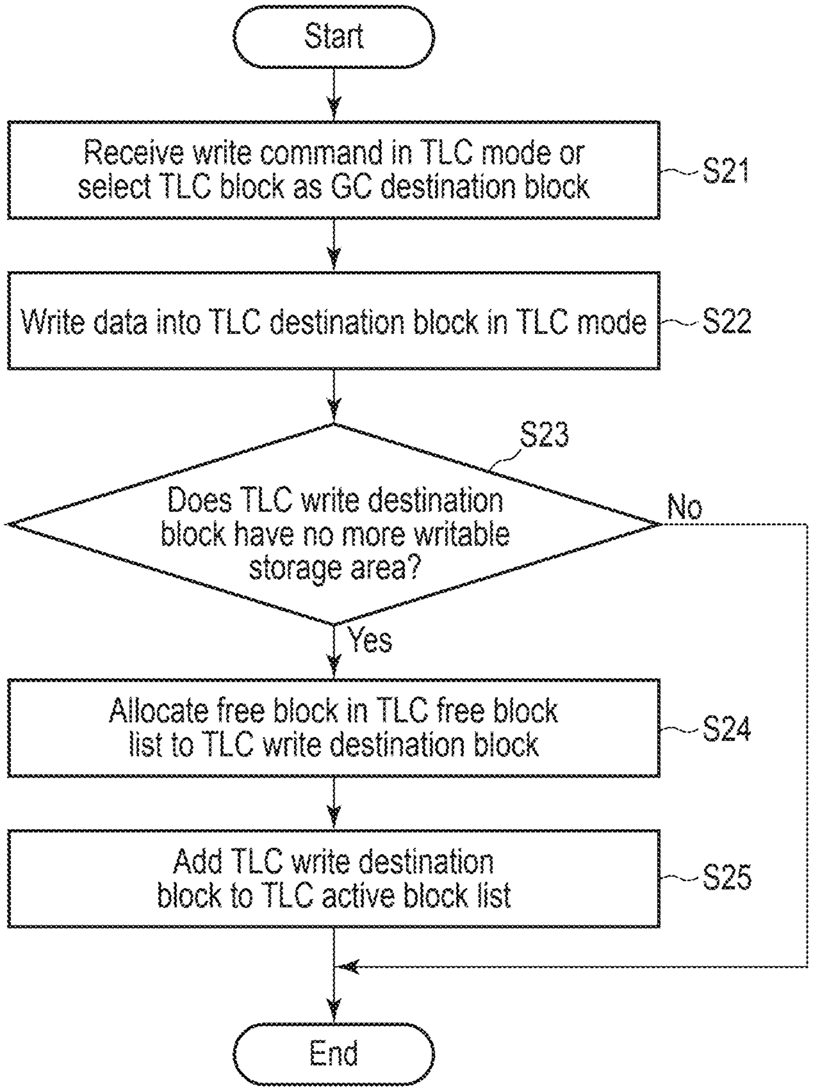
FIG. 8B is a flowchart showing the procedure of data writing to a TLC block executed in the storage device according to the embodiment.

FIG. 8B is a flowchart showing the procedure of data writing to a TLC block executed in the storage device according to the embodiment.

First, the controller 12 receives a write command in the TLC mode or selects a TLC block as a GC destination block in garbage collection (step S21).

The controller 12 writes data into a TLC write destination block (or the GC destination TLC block) in the TLC mode (step S22).

The controller 12 determines whether the TLC write destination block includes no more storage area available to write data (step S23).

When the TLC write destination block includes no more writeable storage area (Yes in S23), the controller 12 selects a TLC free block from the TLC free block list 1127 and allocates it as the TLC write destination block (step S24).

Then, the controller 12 adds the block allocated as the TLC write destination block to the TLC active block list 1126 (step S25).

When the TLC write destination block still includes a writeable storage area (No in S23), the controller 12 ends the data writing.

Figure 8C:
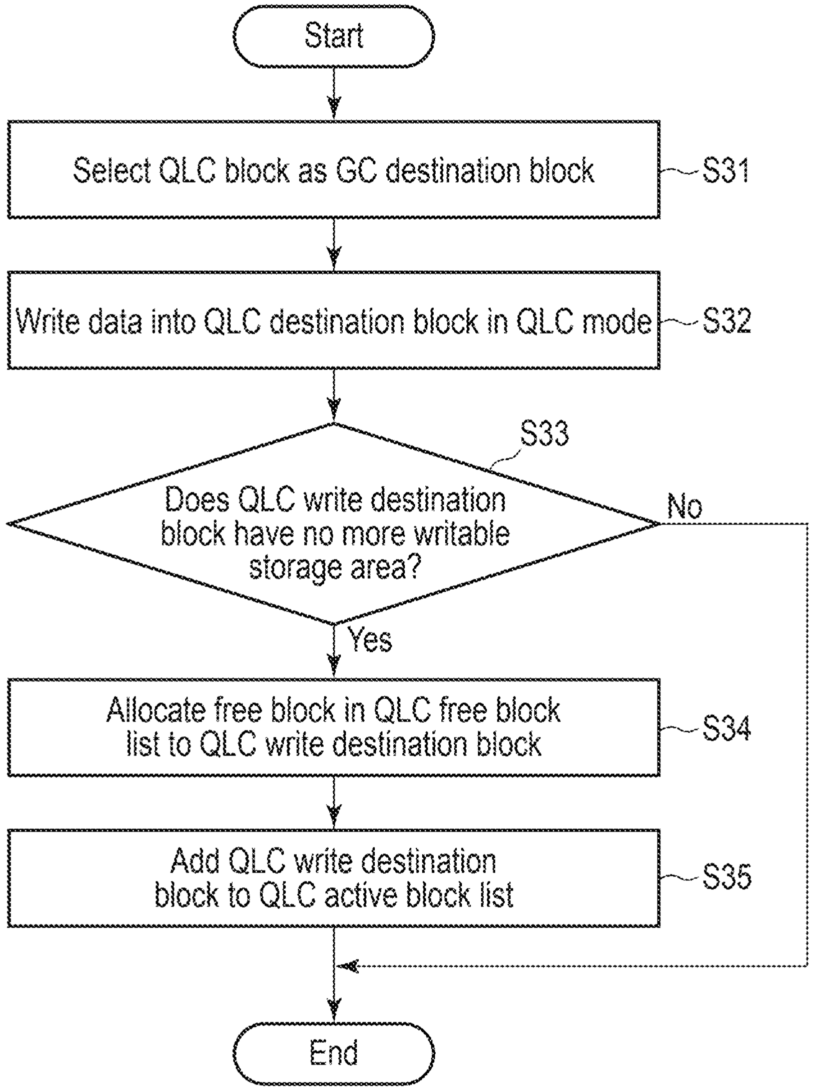
FIG. 8C is a flowchart showing the procedure of data writing to a QLC block executed in the storage device according to the embodiment.

FIG. 8C is a flowchart showing the procedure of data writing to a QLC block executed in the storage device according to the embodiment.

First, the controller 12 selects a QLC block as a GC destination block in garbage collection (step S31).

The controller 12 writes data into the GC destination QLC block in the QLC mode (step S32).

The controller 12 determines whether the QLC write destination block includes no more storage area available to write data (step S33).

When the QLC write destination block includes no more writable storage area (Yes in S33), the controller 12 selects a QLC free block from the QLC free block list 1129 and allocates it as the QLC write destination block (step S34).

Then, the controller 12 adds the block allocated as the QLC write destination block to the QLC active block list 1128 (step S35).

When the QLC write destination block still includes a writeable storage area (No in S33), the controller 12 ends the data writing.

Next, the GC analysis command will be explained. FIG. 9 shows an example of items designated by the garbage collection analysis command that is used in the information processing system 1 according to the embodiment.

The GC analysis command includes information designating a specific area, information designating a group number, and information designating a garbage collection mode.

The information designating a specific area indicates a specific storage area in the UFS device 2. An example of the information designating a specific area is any of information designating a swap area, information designating an SLC area, information designating a TLC area, and information designating a QLC area. The information designating a specific area may also designate a storage area logically by using an LBA. In this case, the information designating a specific area is information designating a start LBA and a length. Furthermore, in a case where the GC analysis command does not include information designating a specific area, the controller 12 executes an analysis of garbage collection on the whole storage areas for storing the user data 111.

The information designating a group number indicates the characteristic of data. For example, the group number designates any one of swap data, hot data, warm data, and cold data. The controller 12 executes an analysis of garbage collection so that each of blocks in which data corresponding to the designated group number is stored becomes a target of the garbage collection. In a case where the GC analysis command does not include information designating a group number, the controller 12 executes the analysis of the garbage collection so that blocks each having a ratio of valid data lower than a threshold value become targets of the garbage collection. The threshold value is, for example, a value determined depending on the size of free storage areas in the UFS device 2.

The information designating a garbage collection mode is information designating either normal garbage collection or garbage collection with a File Based Optimization (FBO). In the garbage collection with the FBO, the host 3 and the UFS device 2 cooperate to copy data so that logically contiguous pieces of data managed by the file system of the host software is also contiguous in the storage area of the nonvolatile memory 11. In a case where the FBO is designated, storage areas storing pieces of data that are not logically contiguous are also determined as targets of the garbage collection. In a case where the GC analysis command does not include information designating a garbage collection mode, the controller 12 executes the analysis of the garbage collection assuming that normal garbage collection will be executed. In the normal garbage collection with which the FBO is not designated, a block with a low ratio of valid data is simply selected as a GC target block with priority, without taking into consideration whether pieces of data are logically contiguous in the storage area of the nonvolatile memory 11.

Furthermore, the GC analysis command does not necessarily have to include any of the information designating a specific area, the information designating a group number, and the information designating a garbage collection mode. In a case where a GC analysis command that does not include any of the information is received, the GC analysis module 422 assumes that normal garbage collection targeting blocks each having a low ratio of valid data will be executed in the whole storage area for storing the user data 111 and executes an analysis of garbage collection. That is, the GC analysis module 422 executes the analysis of garbage collection by using the default settings.

Next, the garbage collection execution command will be explained. FIG. 10 shows an example of items designated by the garbage collection execution command that is used in the information processing system 1 according to the embodiment.

The GC execution command includes information designating a specific area, information designating a group number, information designating a garbage collection mode, information designating an execution timing of garbage collection, information designating a GC amount, information designating a GC destination write mode, and information designating a GC destination temperature.

The information designating a specific area indicates a specific storage area in the UFS device 2. An example of the information designating a specific area is any one of information designating a swap area, information designating an SLC area, information designating a TLC area, and information designating a QLC area. The information designating a specific area may also designate a storage area logically by using an LBA. In this case, the information designating a specific area is information designating a start LBA and a length. Furthermore, in a case where the GC execution command does not include information designating a specific area, the controller 12 executes garbage collection on the whole storage area for storing the user data 111.

The information designating a group number indicates a characteristic of data. For example, the group number designates any one of swap data, hot data, warm data, and cold data. The controller 12 executes garbage collection so that each of blocks in which data corresponding to the designated group number is stored becomes a target of the garbage collection. In a case where the GC execution command does not include information designating a group number, the controller 12 executes the garbage collection so that blocks each having a ratio of valid data lower than a threshold value become targets of the garbage collection. The threshold value is, for example, a value determined depending on the size of free storage areas in the UFS device 2.

The information designating a garbage collection mode is information designating either the normal garbage collection or the garbage collection with the FBO. In a case where the GC execution command does not include information designating a garbage collection mode, the controller 12 executes the normal garbage collection.

The information designating an execution timing of garbage collection is information designating a timing at which the controller 12 executes garbage collection based on the received garbage collection execution command. The information designating an execution timing is either information that designates that garbage collection is to be executed immediately (immediate execution) or information that designates that garbage collection is to be executed at a next hibernation time (execution at next hibernation time). The hibernation time is, for example, a period of time when there is no access from the host 3 to the UFS device 2 for more than a certain period of time. In a case where the execution timing is the immediate execution, the controller 12, in response to receiving the GC execution command, starts GC based on the received GC execution command. In a case where the execution timing is the next hibernation time, the controller 12 starts garbage collection when having transitioned to hibernation after receiving the GC execution command. Furthermore, in a case where the GC execution command does not include the information designating an execution timing, the controller 12, in response to receiving the GC execution command, starts GC based on the received GC execution command.

The information designating a GC amount is information designating an amount of data to be copied in garbage collection executed based on the GC execution command. When generating the GC execution command, the host 3 designates a size of data to be copied by garbage collection by using a GC amount included in the GC execution command. For example, the host 3 determines the GC amount based on the results of the analysis. The host 3 may designate the GC amount in read units (e.g., 4 KB). In a case where the GC execution command does not include information designating a GC amount, the controller 12 executes garbage collection at a maximum garbage collection (GC) applicable amount. The maximum GC applicable amount is a total size of data to be copied in the garbage collection executed based on the received GC execution command.

The information designating a GC destination write mode designates a write mode in which data is written into a copy destination, in the garbage collection executed based on the GC execution command. That is, when generating the GC execution command, the host 3 designates a copy destination storage area into which data is to be copied by the garbage collection from any of the SLC area 1111, the TLC area 1112, and the QLC area 1113. In a case where the GC execution command does not include the information designating a GC destination write mode, the controller 12 executes the garbage collection by designating the TLC area 1112 as a copy destination storage area in which data is to be copied by the garbage collection. Alternatively, instead of designating the TLC area 1112, the controller 12 may be set as a default to select a copy destination storage area such that a write mode in which copy source data was written is maintained.

The information designating a GC destination temperature designates a temperature of data after being copied in the garbage collection executed based on the GC execution command. The GC destination temperature designates any of hot data, warm data, and cold data. When generating the GC execution command, the host 3 may designate a post-copy temperature characteristic of data to be copied by the garbage collection. In a case where the GC execution command does not include information designating a GC destination temperature, the controller 12 executes the garbage collection so that the temperature of the data to be copied is maintained before and after the garbage collection.

Furthermore, the GC execution command does not necessarily have to include any of the information designating a specific area, the information designating a group number, the information designating a garbage collection mode, the information designating an execution timing of garbage collection, the information designating a GC amount, the information designating a GC destination write mode, and the information designating a GC destination temperature.

Next, the GC restriction command will be explained. FIG. 11 shows an example of items designated by the garbage collection restriction command that is used in the information processing system 1 according to the embodiment.

The GC restriction command includes information designating a specific area, information designating a group number, and information designating a priority.

The information designating a specific area indicates a specific storage area in the UFS device 2 on which execution of garbage collection is restricted (also referred to as a GC restriction area). An example of the information designating a specific area is any of information designating a swap area, information designating an SLC area, information designating a TLC area, and information designating a QLC area. The information designating a storage area may also logically designate a specific area by using an LBA. In this case, the information designating a specific area is information designating a start LBA and a length. Furthermore, in a case where the GC restriction command does not include information designating a storage area, the controller 12 restricts execution of garbage collection on the whole storage area for storing the user data 111.

The information designating a group number indicates a characteristic of data. For example, the group number designates any one of swap data, hot data, warm data, and cold data. The controller 12 controls each of blocks in which data corresponding to the designated group number is stored so that it is not selected as a target of garbage collection. In a case where the GC restriction command does not include information designating a group number, the controller 12 treats a characteristic of data that is not selected as a target of garbage collection as designating no specific characteristic.

In a case where storage areas and/or group numbers are designated by GC restriction commands, the information designating a priority designates a priority with which each of the storage areas and/or group numbers is to be excluded from a GC target. For example, it is assumed that a GC restriction command designates cold data in an SLC area and a GC restriction command designates cold data in a TLC area, and that the priority of the cold data in the SLC area is "1" (high priority) and that of the cold data in the TLC area is "0" (low priority). Here, in a case where not enough free area is available and it is necessary to execute GC even in the areas designated by the GC restriction command, the controller 12 first executes GC on the cold data in the TLC area having the low priority. Then, in a case where further GC needs to be executed, the controller 12 executes GC on the cold data in the SLC area. That is, the higher a priority of a GC restriction area, the less likely it is that GC will be executed in that storage area. In a case where the GC restriction command does not include information designating a priority, the controller 12 assigns a priority "1" to the storage area designated by the GC restriction command.

Figure 12A:
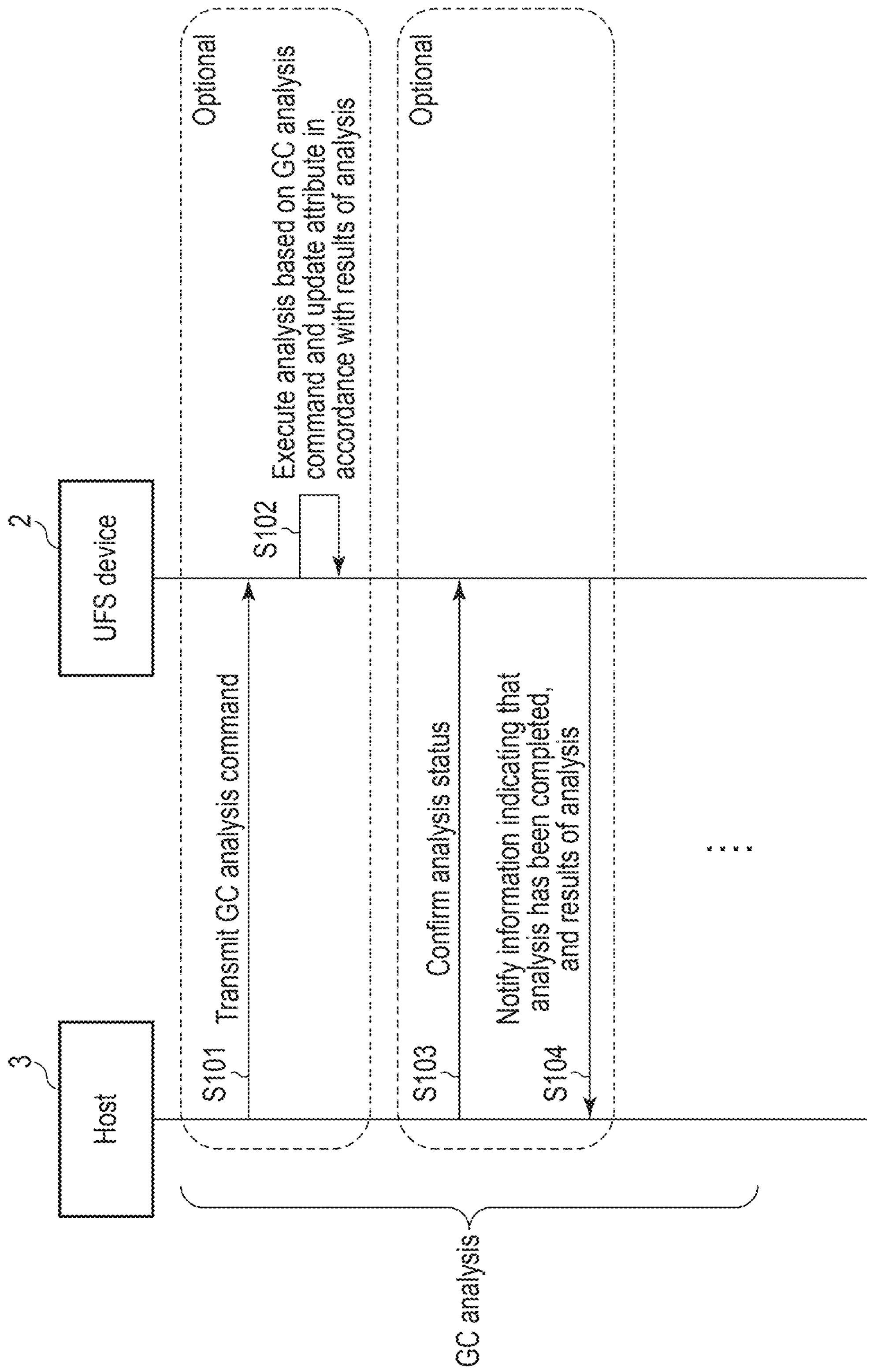
FIG. 12A is a sequence diagram showing the procedure of a garbage collection analysis process executed by the information processing system according to the embodiment.

Next, a garbage collection analysis process, a garbage collection execution process, a garbage collection abort process, and a garbage collection suppression process that are executed in the information processing system 1 will be described. FIG. 12A is a sequence diagram showing the procedure of the garbage collection analysis process executed by the information processing system 1 according to the embodiment.

First, the host 3 transmits a GC analysis command to the UFS device 2 (step S101). Here, the GC analysis command may include information designating a specific area, a group number, and a GC mode. The GC analysis command is, for example, COMMAND UPIU.

The UFS device 2 executes an analysis based on the GC analysis command received in step S101 (step S102). Then, the UFS device 2 updates the attribute information (attribute) based on the results of the analysis. As a result, information indicating that the analysis has been completed and the results of the analysis are stored in the attribute information.

Since steps S101 and S102 are optional steps, the information processing system 1 may omit steps S101 and S102.

The host 3 transmits, to the UFS device, a command 2 to confirm an analysis status (step S103). This command is, for example, QUERY REQUEST UPIU.

Based on the command received in step S103, the UFS device 2 notifies that the analysis has been completed and the results of the analysis (step S104). Specifically, the UFS device 2 transmits the attribute information (attribute) to the host 3 in response to the QUERY REQUEST UPIU received in step S103. In a case where steps S101 and S102 have been skipped, in step S104, the UFS device 2 transmits, to the host 3, information indicating that an analysis is not executed.

Since steps S103 and S104 are optional steps, the information processing system 1 may omit steps S103 and S104.

Steps S101 to S104 are the GC analysis process; however, the information processing system 1 may skip the GC analysis process and execute the garbage collection execution process.

Figure 12B:
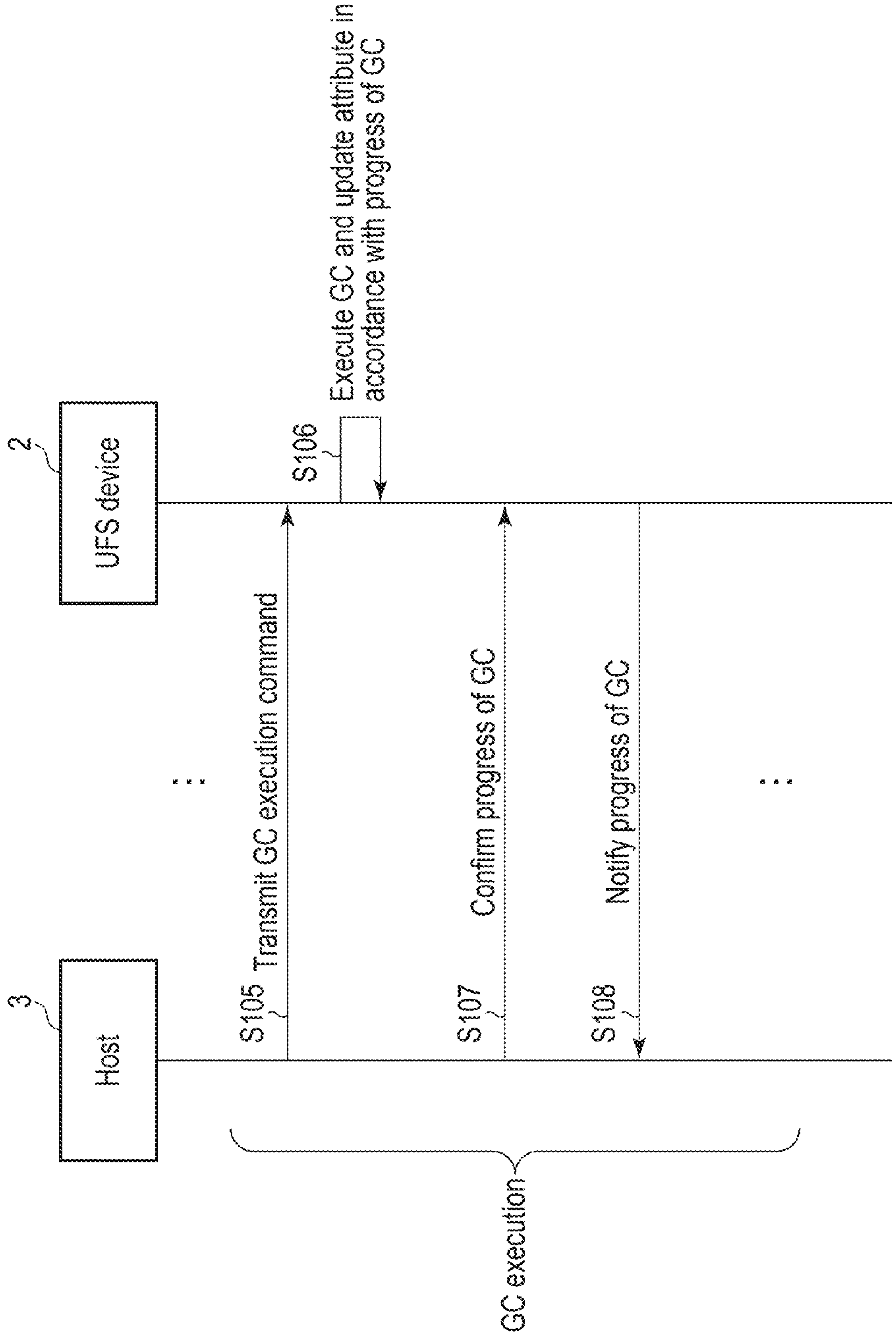
FIG. 12B is a sequence diagram showing the procedure of a garbage collection execution process executed by the information processing system according to the embodiment.

FIG. 12B is a sequence diagram showing the procedure of the garbage collection execution process executed by the information processing system 1 according to the embodiment.

The host 3 transmits a GC execution command to the UFS device 2 (step S105). The GC execution command is a command generated by the host 3, based on the results of the analysis obtained in step 104. Here, the GC execution command may include information designating a specific area, a group number, a GC mode, an execution timing, a GC amount, a GC destination write mode, and a GC destination temperature. The GC execution command is, for example, COMMAND UPIU.

The UFS device 2 executes garbage collection based on the GC execution command received in step S105 (step S106). In a case where the GC analysis process from step S101 to step S104 has been skipped, the UFS device 2 executes an analysis based on the information included in the GC execution command, updates the attribute information with the results of the analysis, and then starts garbage collection. Then, the UFS device 2 updates the attribute information (attribute) with the progress of the garbage collection as the garbage collection progresses. Thus, as the progress of the garbage collection, a ratio of data that has already been copied so far to the size of data should be copied is stored in the attribute information.

In a case where the GC analysis process (steps S101 to S104) has been skipped, the UFS device 2 executes the analysis of garbage collection before executing garbage collection, in response to receiving the GC execution command.

The host 3 transmits, to the UFS device 2, a command to confirm the progress of the garbage collection (step S107). This command is, for example, QUERY REQUEST UPIU.

The UFS device 2 notifies the progress of the garbage collection, based on the command received in step S107 (step S108). Specifically, the UFS device 2 transmits the attribute information (attribute) to the host 3 in response to the QUERY REQUEST UPIU received in step S107.

Figure 12C:
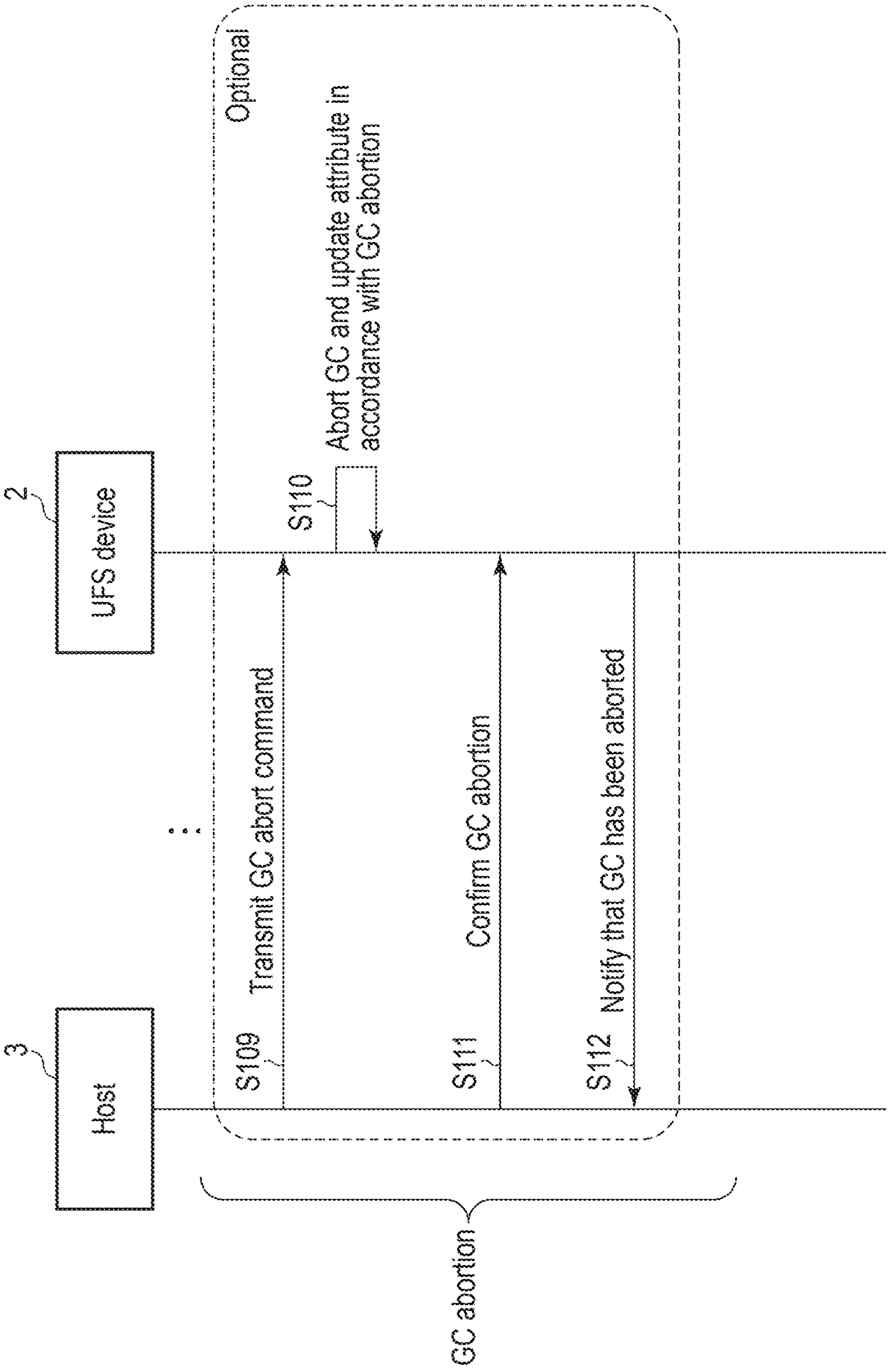
FIG. 12C is a sequence diagram showing the procedure of a garbage collection abort process executed by the information processing system according to the embodiment.

The information processing system 1 may execute the garbage collection abort process while the UFS device 2 is executing garbage collection. FIG. 12C is a sequence diagram showing the procedure of the garbage collection abort process executed by the information processing system 1 according to the embodiment.

The host 3 transmits a garbage collection (GC) abort command to the UFS device 2 (step S109). The host 3 may transmit a GC abort command, for example, when a new access occurs while the UFS device 2 is executing garbage collection. The GC abort command is, for example, a COMMAND UPIU.

The UFS device 2 aborts the garbage collection being executed in response to receiving the GC abort command in step S109 (step S110). Then, the UFS device 2 updates the attribute information (attribute) based on the fact that the garbage collection has been aborted. As a result, information indicating that the garbage collection has been aborted is stored in the attribute information.

The host 3 transmits a command to the UFS device 2 to confirm that the garbage collection has been aborted (step S111). This command is, for example, a QUERY REQUEST UPIU.

The UFS device 2 notifies that the garbage collection has been aborted, based on the command received in step S111 (step S112). Specifically, the UFS device 2 transmits the attribute information (attribute) to the host 3 in response to the QUERY REQUEST UPIU received in step S111.

The garbage collection abort process does not necessarily have to be executed. Therefore, the procedure from step S109 to step S112 may be skipped. For example, the host 3 transmits a garbage collection abort command to the UFS device 2 when a process (e.g., a data write/read process) to be prioritized over the garbage collection has occurred.

The host 3 transmits the GC restriction command to the UFS device 2 at any timing. The UFS device 2 executes garbage collection based on the GC execution command received in step S105 (step S106). At this time, the GC execution module 423 of the UFS device 2 excludes a specific area designated by the GC restriction command or a storage area in which data corresponding to a group number designated by the GC restriction command is stored from an execution target of the GC. This restricts GC to the storage area designated by the GC restriction command. However, in a case where a necessary write area cannot be secured without executing GC, the GC execution module 423 executes GC on the storage area designated by the GC restriction command.

Next, a first specific example of the garbage collection process will be described with reference to FIG. 13A to FIG. 13D. Here, it is assumed a case where garbage collection is executed to move warm data stored in the SLC area 1111 to the QLC area 1113 as cold data.

Figure 13A:
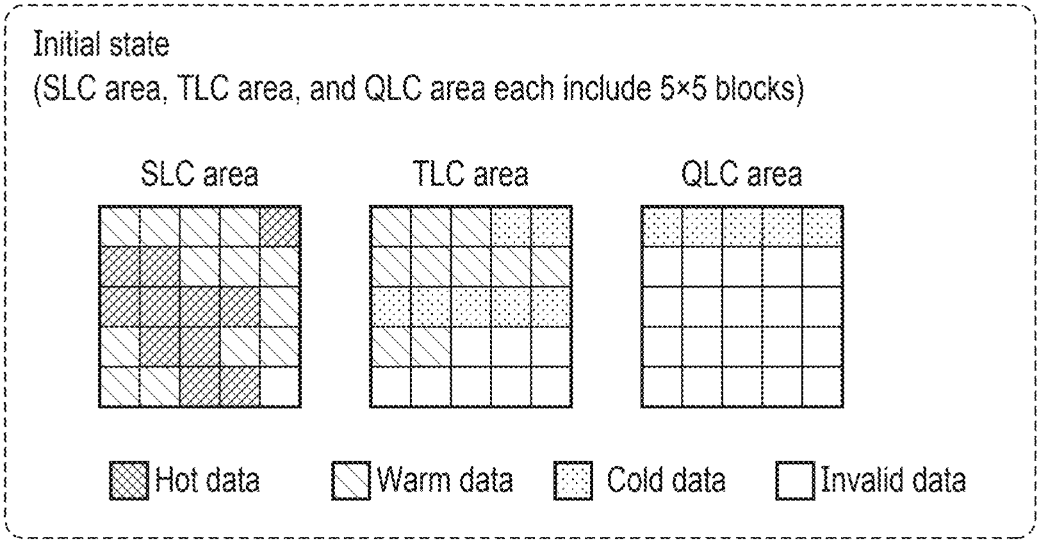
FIG. 13A is a first diagram showing a first specific example of a garbage collection process executed by the information processing system according to the embodiment.

First, an initial state, which is a state before the garbage collection on the storage area of the nonvolatile memory 11 is executed, will be described. FIG. 13A is a first diagram showing the first specific example of the garbage collection process executed by the information processing system 1 according to the embodiment. In FIG. 13A, the SLC area 1111, the TLC area 1112, and the QLC area 1113 are shown in the initial state. Here, each area is 25 (5×5) blocks.

Here, each block stores pieces of data with the same characteristic. In other words, pieces of data with different characteristics are not mixed in one block. Therefore, each of pieces of data stored in one block corresponds to the same group number.

The SLC area 1111 includes blocks that store hot data, blocks that store warm data, and free blocks. In FIG. 13A, the SLC area 1111 includes 11 blocks storing hot data, 13 blocks storing warm data, and one free block.

The TLC area 1112 includes blocks that store warm data, blocks that store cold data, and free blocks. In FIG. 13A, the TLC area 1112 includes ten blocks storing warm data, seven blocks storing cold data, and eight free blocks.

The QLC area 1113 includes blocks that store cold data and free blocks. In FIG. 13A, the QLC area 1113 includes five blocks storing cold data and 20 free blocks.

Figure 13B:
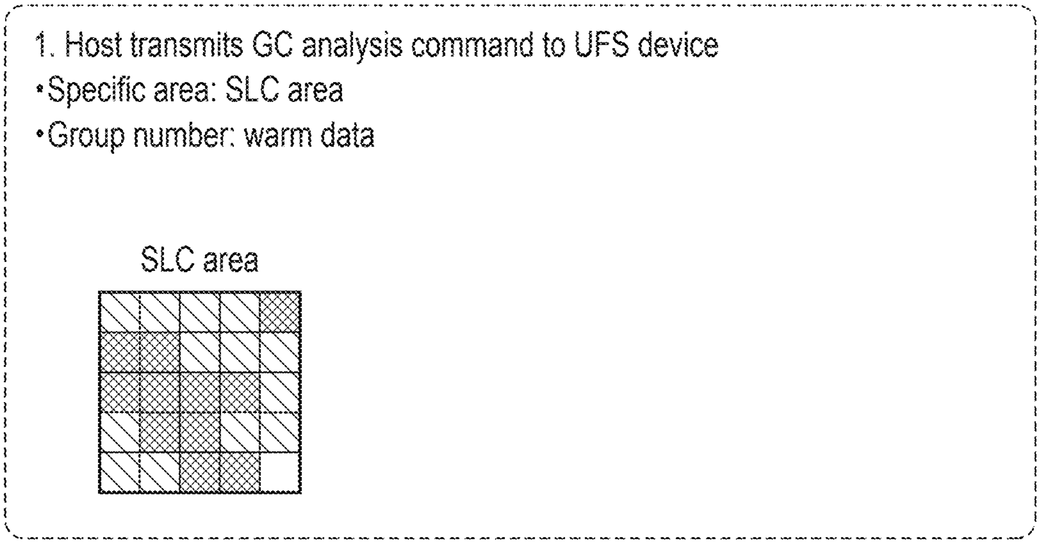
FIG. 13B is a second diagram showing the first specific example of the garbage collection process executed by the information processing system according to the embodiment.

The host 3 then transmits a GC analysis command to the UFS device 2. FIG. 13B is a second diagram showing the first specific example of the garbage collection process executed by the information processing system 1 according to the embodiment.

The host 3 generates a GC analysis command that designates the SLC area 1111 and warm data. Information designating a storage area, which is included in the GC analysis command, is information designating the SLC area 1111. For example, in a case where the SLC area 1111 is designated by an LBA range, the GC analysis command includes information designating, as the LBA range, the start LBA and the length of the SLC area 1111. Here, the length is, for example, the number of LBAs corresponding to this LBA range. Information indicative of a tag corresponding to a characteristic of data, which is included in the GC analysis command, is information designating warm data. For example, the GC analysis command includes a group number corresponding to warm data.

Figure 13C:
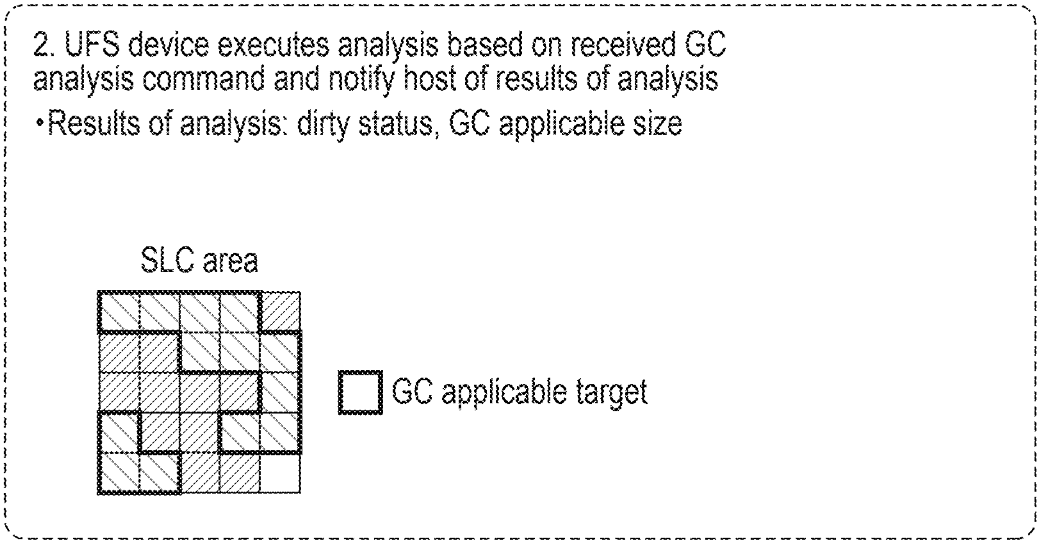
FIG. 13C is a third diagram showing the first specific example of the garbage collection process executed by the information processing system according to the embodiment.

The UFS device 2 then executes an analysis based on the received GC analysis command. FIG. 13C is a third diagram of the first specific example of the garbage collection process executed by the information processing system 1 according to the embodiment.

Based on the received GC analysis command, the UFS device 2 identifies blocks in the SLC area 1111 that store warm data as GC applicable target blocks. Then, the UFS device 2 updates the attribute information with a dirty status and a GC applicable size relating to the GC applicable target blocks as the results of the analysis.

Here, the dirty status indicates a ratio of the number of blocks used for storing warm data in the SLC area 1111 to the number of blocks included in the SLC area 1111. The GC applicable size indicates the total size of valid data among the warm data stored in the SLC area 1111.

In FIG. 13C, since 13 blocks among the 25 blocks of the SLC area 1111 are used to store warm data, the UFS device 2 updates the attribute information with information indicative of 52% as the dirty status. In a case where no invalid data is stored in the blocks that store warm data, the UFS device 2 updates the attribute information with information indicative of the size of data of the 13 blocks as the GC applicable size.

The UFS device 2 notifies the attribute information including the results of the analysis to the host 3 in response to receiving a command to obtain the results of the analysis. The host 3 thereby obtains the results of the analysis from the UFS device 2.

Figure 13D:
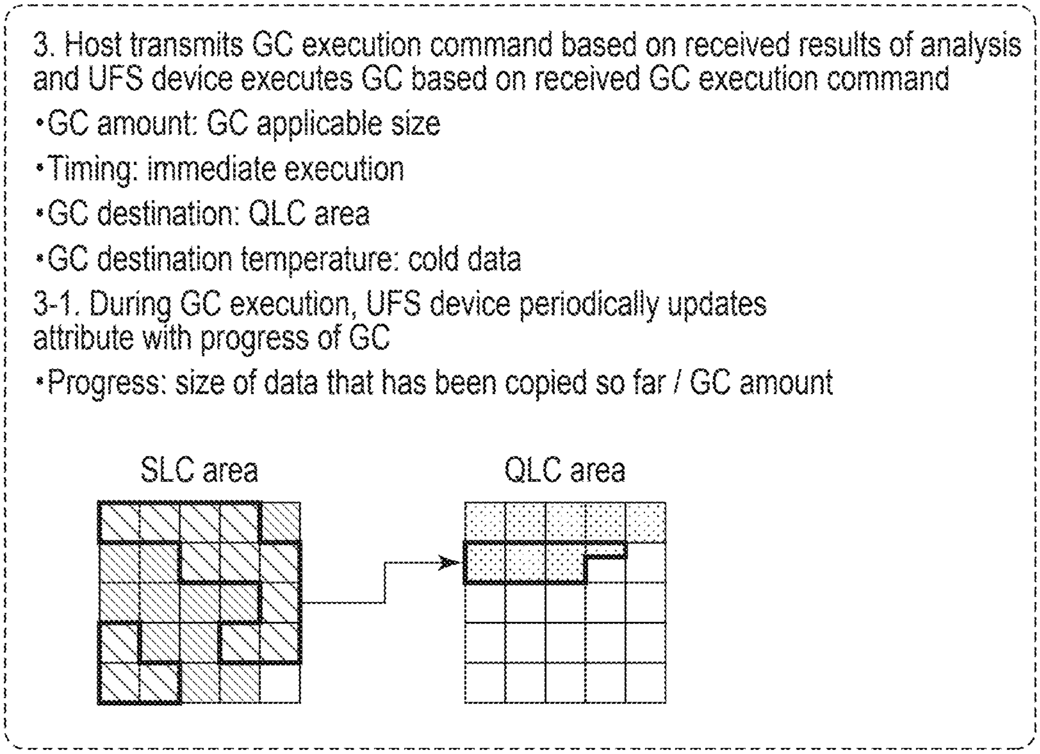
FIG. 13D is a fourth diagram showing the first specific example of the garbage collection process executed by the information processing system according to the embodiment.

Next, the host 3 transmits a GC execution command to the UFS device 2, based on the obtained results of the analysis. FIG. 13D is a fourth diagram showing the first specific example of the garbage collection process executed by the information processing system 1 according to the embodiment.

The host 3 generates a GC execution command based on the obtained results of the analysis. In the generated GC execution command, information designating a target storage area of garbage collection indicates the SLC area 1111, and information designating a characteristic of target data of the garbage collection indicates warm data. This GC execution command further includes information designating the GC applicable size as a GC amount, information designating immediate execution as a GC execution timing, information designating the QLC area 1113 as a GC destination storage area, and information designating cold data as a GC destination temperature.

Thus, the UFS device 2 starts garbage collection in response to receiving the GC execution command. Since the GC applicable size is designated, the UFS device 2 determines a data size corresponding to the 13 blocks in the SLC area 1111, which are all blocks that are GC applicable targets, as the total size of data to be copied in the current garbage collection. Since the QLC area 1113 is designated as a storage area of GC destination, the UFS device 2 allocates free blocks included in the QLC area 1113 as GC destination QLC blocks. Then, the UFS device 2 updates the data management table 1123 so that the copied data is managed as cold data.

The size of data that can be stored in one block in the QLC area 1113 corresponds to the total size of data that can be stored in four blocks in the SLC area 1111. Therefore, data stored in the 13 blocks in the SLC area 1111 is copied to four blocks in the QLC area 1113. In one of the four blocks, ¼ of the storage area is used.

While executing the garbage collection, the UFS device 2 periodically updates the attribute information (attribute) with the progress of the garbage collection. The progress of the garbage collection indicates a ratio of the total size of data that has already been copied so far to the total size of data to be (should be) copied in the current garbage collection (GC). The UFS device 2 transmits the attribute information including the progress of the GC to the host 3 in response to receiving, from the host 3, a command to obtain the progress of the GC.

Next, a second specific example of the garbage collection process will be described with reference to FIG. 14A to FIG. 14D. Here, it is assumed a case where garbage collection is executed to move part of warm data stored in the TLC area 1112 to the SLC area 1111.

Figure 14A:
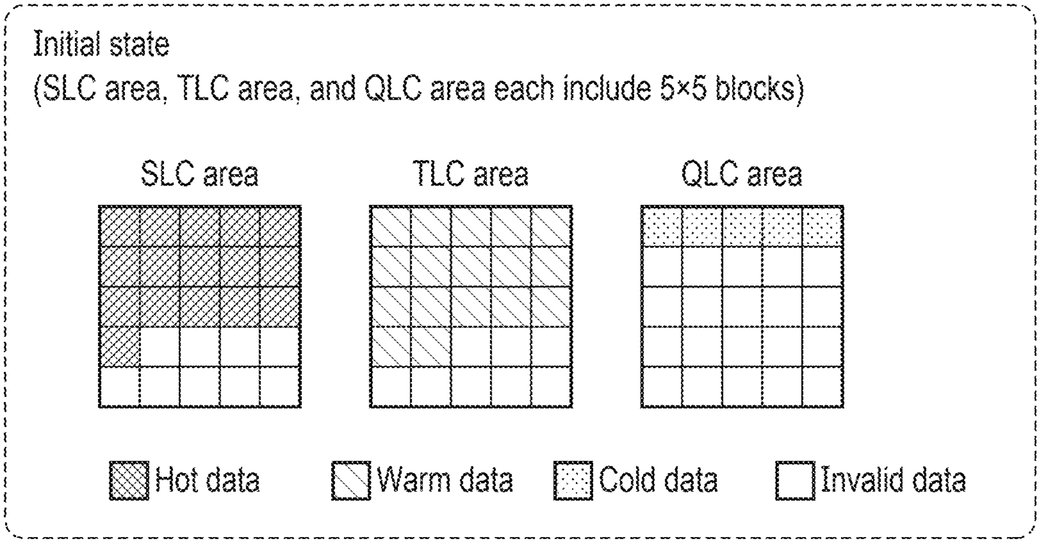
FIG. 14A is a first diagram showing a second specific example of the garbage collection process executed by the information processing system according to the embodiment.

FIG. 14A is a first diagram showing the second specific example of the garbage collection process executed by the information processing system 1 according to the embodiment. In FIG. 14A, the SLC area 1111, the TLC area 1112, and the QLC area 1113 in their initial state are shown. Here, each area is 25 (5×5) blocks.

Here, each block stores pieces of data having the same characteristic. In other words, pieces of data having different characteristics are not mixed in one block. Therefore, pieces of data stored in one block correspond to the same group number.

The SLC area 111 includes blocks that store hot data and free blocks. In FIG. 14A, the SLC area 1111 includes 16 blocks storing hot data and nine free blocks.

The TLC area 1112 includes blocks that store warm data and free blocks. In FIG. 14A, the TLC area 1112 includes 17 blocks storing warm data and eight free blocks.

The QLC area 1113 includes blocks that store cold data and free blocks. In FIG. 14A, the QLC area 1113 includes five blocks storing cold data and 20 free blocks.

Figure 14B:
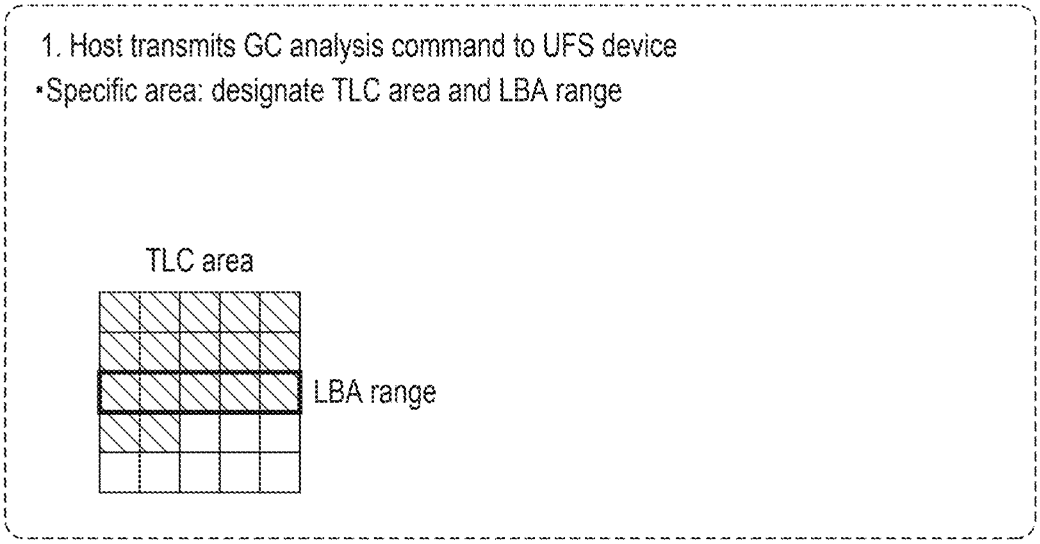
FIG. 14B is a second diagram showing the second specific example of the garbage collection process executed by the information processing system according to the embodiment.

The host 3 then transmits a GC analysis command to the UFS device 2. FIG. 14B is a second diagram showing the second specific example of the garbage collection process executed by the information processing system 1 according to the embodiment.

The host 3 generates a GC analysis command that designates the TLC area 1112 and a specific LBA range. Information designating a storage area included in the GC analysis command is information designating the TLC area 1112. In this case, the GC analysis command includes information indicating the start LBA and the length of the LBA range in the TLC area 1112. Here, the length is, for example, the number of LBAs corresponding to this LBA range. Information indicating a tag corresponding to a characteristic of data, which is included in the GC analysis command, is not designated.

Figure 14C:
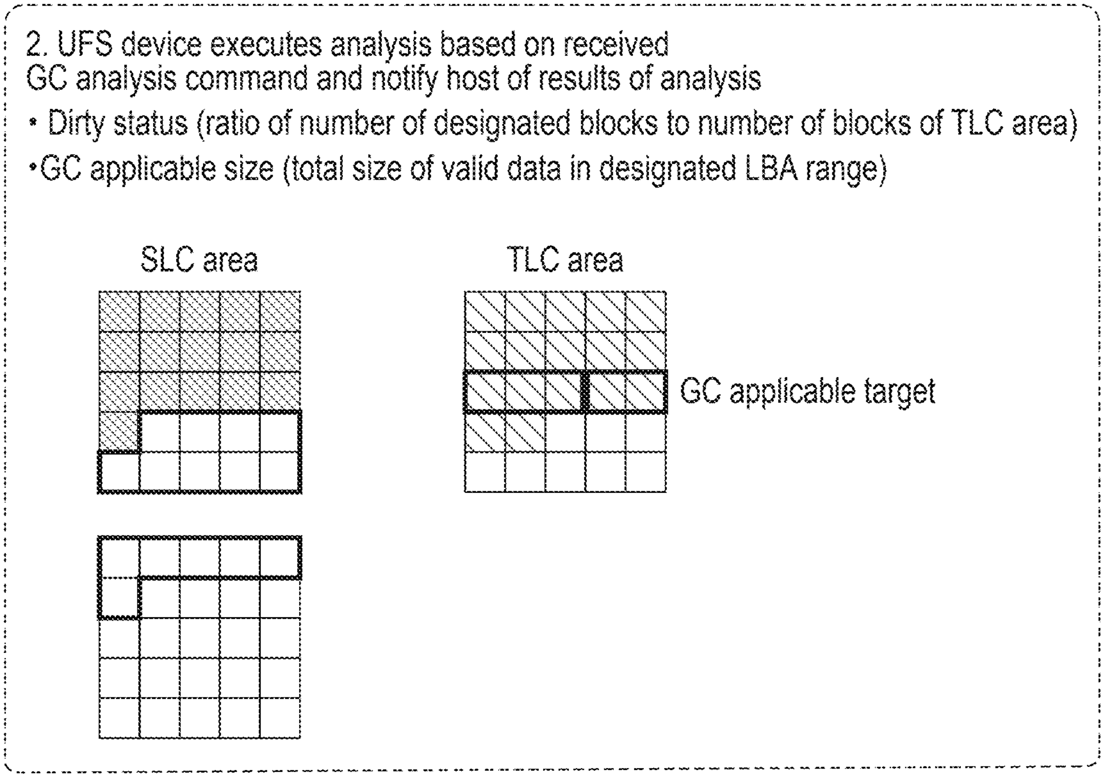
FIG. 14C is a third diagram showing the second specific example of the garbage collection process executed by the information processing system according to the embodiment.

Next, the UFS device 2 executes an analysis based on the GC analysis command received. FIG. 14C is a third diagram of the second specific example of the garbage collection process executed by the information processing system 1 according to the embodiment.

Based on the received GC analysis command, the UFS device 2 identifies blocks in the TLC area 1112 that correspond to the LBAs having the designated length, as GC applicable target blocks. Then, the UFS device 2 updates the attribute information for the identified GC applicable blocks with their dirty status and GC applicable size as the results of the analysis.

Here, the dirty status indicates a ratio of the number of blocks in the TLC area 1112 that correspond to the LBAs having the designated length to the number of blocks included in the TLC area 1112. The GC applicable size indicates the total size of valid data of the designated LBA range stored in the TLC area 1112.

In FIG. 14C, since five blocks among the 25 blocks of the TLC area 1112 have been designated, the UFS device 2 updates the attribute information with information indicative of 20% as the dirty status. In a case where no invalid data is stored in the designated five blocks, the UFS device 2 updates the attribute information with information indicative of the size of data of the five blocks as the GC applicable size.

In response to receiving a command to obtain the results of the analysis, the UFS device 2 notifies the host 3 of the attribute information including the results of the analysis. The host 3 thereby obtains the results of the analysis from the UFS device 2.

Figure 14D:
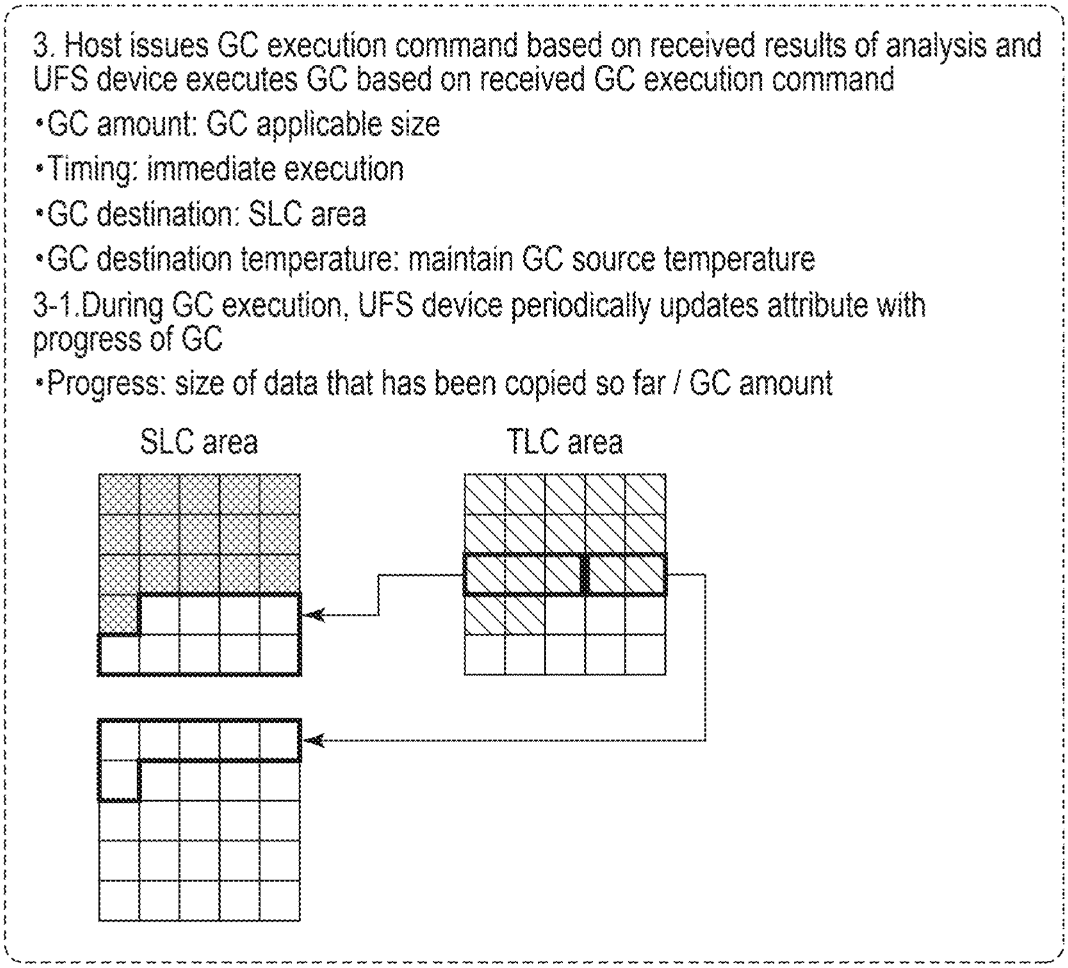
FIG. 14D is a fourth diagram showing the second specific example of the garbage collection process executed by the information processing system according to the embodiment.

Next, the host 3 transmits a GC execution command to the UFS device 2 based on the obtained results of the analysis. FIG. 14D is a fourth diagram showing the second specific example of the garbage collection process executed by the information processing system 1 according to the embodiment.

The host 3 generates a GC execution command based on the obtained results of the analysis. In the generated GC execution command, information designating a target storage area of garbage collection indicates the TLC area 1112, and a characteristic of target data of the garbage collection is not designated. In addition, this GC execution command includes information designating the GC applicable size as a GC amount, information designating immediate execution as a GC execution timing, information designating the SLC area 1111 as a storage area of GC destination, and information designating that the temperature of the GC source is maintained as a temperature of the GC destination.

Thus, the UFS device 2 starts garbage collection in response to receiving the GC execution command.

The size of data that can be stored in one block in the TLC area 1112 corresponds to the total size of data that can be stored in three blocks in the SLC area 1111. Therefore, 15 free blocks in the SLC area 1111 are needed to copy data stored in five blocks in the TLC area 1112 to the SLC area 1111. However, since the number of free blocks in the SLC area 1111 is nine, only data of a size equivalent to three blocks in the TLC area 1112 can be copied. Therefore, the data size corresponding to the three blocks in the TLC area 1112 is determined as the total size of data to be copied in the current garbage collection. Since the SLC area 1111 is designated as the storage area of the GC destination, the UFS device 2 allocates the free blocks included in the SLC area 1111 as GC destination SLC blocks. Then, the UFS device 2 updates the data management table 1123 so that the copied data is managed as warm data.

Also, for example, the UFS device 2 secures a new SLC area 1111 and copies the data stored in the remaining two blocks in the TLC area 1112 to six free blocks in the secured SLC area 1111.

The size of data that can be stored in one block in the TLC area 1112 corresponds to the total size of data that can be stored in three blocks in the SLC area 1111. Therefore, the data stored in the five blocks in the TLC area 1112 is copied to 15 blocks in the SLC area 1111.

While executing the garbage collection, the UFS device 2 periodically updates the attribute information (attribute) with the progress of the garbage collection. The progress of the garbage collection indicates a ratio of the total size of data that has already been copied so far to the total size of data to be (should be) copied in the current garbage collection (GC). In response to receiving a command from the host 3 to obtain the progress of the GC, the UFS device 2 transmits the attribute information including the progress of the GC to the host 3.

Figure 15:
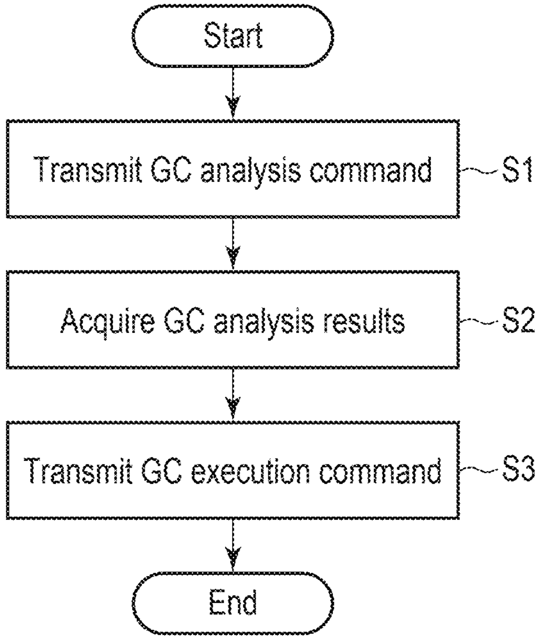
FIG. 15 is a flowchart showing the procedure of a garbage collection process executed in a host according to the embodiment.

Next, the procedure of a garbage collection process in the host 3 will be described. FIG. 15 is a flowchart showing the garbage collection process executed in the host 3.

First, the host 3 transmits a GC analysis command to the UFS device 2 (step S1).

The host 3 transmits a command to the UFS device 2 to obtain GC analysis results based on the GC analysis command transmitted in step S1. Then, the host 3 obtains the GC analysis results from the UFS device 2 (step S2). The host 3 generates a GC execution command based on the obtained GC analysis results.

The host 3 transmits the generated GC execution command to the UFS device 2 (step S3). The host 3 determines information included in the GC execution command, thereby controlling garbage collection executed in the UFS device 2.

This enables the host 3 to control the garbage collection executed in the UFS device 2 so that the garbage collection is appropriate for the host 3.

As explained above, according to the embodiment of the information processing system 1, the UFS device 2 executes garbage collection based on a garbage collection execution command received from the host 3. In this garbage collection execution command, for example, a specific area, a group number, a GC mode, an execution timing, a GC amount, and a GC destination write mode may be designated.

This enables the host 3 to cause the UFS device 2 to execute garbage collection in which data in the UFS device 2 is moved so that the data is stored in an optimal storage area.

For example, by moving data stored in an SLC area to a TLC or QLC area, or by moving data stored in a TLC area to a QLC area, the data that was written into the UFS device 2 at high speed can be moved to a storage area where the data write/read speed is slow. In addition, by moving data stored in a TLC area to an SLC area, or by moving data stored in a QLC area to an SLC or TLC area, data can be moved to a storage area with a faster write/read speed.

This enables the host 3 to manage data in such a way that: data desired to be used at high speed is stored in a storage area with a faster write/read speed; and data accessed infrequently is stored in a storage area with a slower write/read speed.

The host 3 also issues a GC restriction command to restrict particular data being moved because of garbage collection triggered by the UFS device 2. For example, the host 3 issues a GC restriction command designating an SLC area that stores data desired to be used at high speed, thereby restricting the data being moved from the SLC area to another storage area. In addition, since hot data is likely to be rewritten soon, the host 3 can restrict GC that is expected to be wasted by issuing a GC restriction command that designates the hot data.

Furthermore, it is assumed a case where, for example, the host 3 transmits a write command to the UFS device 2 to write swap data when there is insufficient free storage space in the swap area 1111 in the UFS device 2. If an information processing system does not use a garbage collection execution command of the present embodiment, the UFS device 2 receives the write command, temporarily evacuates data stored in the swap area 1111 to secure free space in the swap area 1111, and then processes the write command. Therefore, latency occurs in the process of the write command.

In contrast, in the present embodiment, in a case where there is insufficient free storage space in the swap area 1111, the host 3 can transmit a garbage collection execution command that designates the swap area 1111 to the UFS device 2 in advance. Upon receiving this garbage collection execution command, the UFS device 2 executes garbage collection for the swap area 1111. Therefore, the host 3 can prevent latency for the write command to write the swap data from occurring in advance.

Although the description assumes a case where the storage device of the information processing system 1 according to the embodiment is the UFS device 2, the storage device may be a memory card such as an SD™ card, or may be a solid state drive (SSD). In addition, in a case where the storage device is a memory card or an SSD, the host I/F 31 may communicate with the host 3 in accordance with a standard conforming to an SD™ interface, SAS (serial attached SCSI (small computer system interface)), SATA (serial ATA (advanced technology attachment)), or PCIe™ (peripheral component interconnect express).

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. An information processing system comprising:

a host; and a storage device connected to the host and capable of communicating with the host, based on a universal flash storage (UFS) standard, wherein the storage device includes a nonvolatile memory and a controller, the nonvolatile memory includes a plurality of memory cells each of which stores one or more bits of data, the controller is configured to:

write, in a first write mode, one bit of data to each of the plurality of memory cells, and write, in a second write mode, multiple bits of data to each of the plurality of memory cells; and manage a relationship between each of pieces of data stored in the nonvolatile memory and one of a plurality of tags each indicating a characteristic of data, the nonvolatile memory includes a swap area storing data that is not selected as an execution target of garbage collection triggered by the controller, is written in the first write mode, and corresponds to a first tag included in a write command received from the host, the host is configured to transmit, to the storage device, a first command to execute garbage collection, the first command including information designating, in a case where data is copied in the garbage collection, temperature of the copied data, the controller is configured to:

start the garbage collection in response to the first command received; and record progress of the garbage collection in accordance with the garbage collection in progress, the host is configured to transmit, to the storage device, a second command to confirm the progress, and the controller is configured to notify the host of the progress in response to the second command received.

2. The information processing system according to claim 1, wherein the host is configured to transmit, to the storage device, a third command to execute an analysis relating to garbage collection for the host, the controller is configured to execute the analysis in response to the third command received, the host is configured to transmit, to the storage device, a fourth command to obtain results of the analysis, the controller is configured to notify the host of the results of the analysis in response to the fourth command received, and the host is configured to transmit the first command to the storage device, based on the results of the analysis.

3. The information processing system according to claim 2, wherein the third command includes information designating one or more storage areas among a plurality of storage areas that are included in the nonvolatile memory.

4. The information processing system according to claim 2, wherein the third command includes information indicative of one tag among the plurality of tags.

5. The information processing system according to claim 1, wherein the first command includes information designating one or more storage areas among a plurality of storage areas that are included in the nonvolatile memory.

6. The information processing system according to claim 1, wherein the first command includes information indicative of one tag among the plurality of tags.

7. The information processing system according to claim 1, wherein the first command includes information designating a timing at which the garbage collection based on the first command is executed.

8. The information processing system according to claim 1, wherein the first command includes information designating a total size of data to be copied by the garbage collection based on the first command.

9. The information processing system according to claim 1, wherein the first command includes information designating a write mode in which data is copied in the garbage collection based on the first command.

10. The information processing system according to claim 1, wherein the first command includes information designating a mode of the garbage collection executed based on the first command.

11. The information processing system according to claim 1, wherein the host is configured to transmit, to the storage device, a fifth command to restrict garbage collection on data stored in a corresponding storage area, and the controller is configured to prioritize execution of garbage collection for storage areas that are not designated by the fifth command received.

12. The information processing system according to claim 11, wherein the fifth command includes at least one of:

information designating one or more storage areas among a plurality of storage areas that are included in the nonvolatile memory;

information indicative of one tag among the plurality of tags; and information designating a priority with which each of one or more storage areas is selected as a target for the garbage collection, the one or more storage areas being identified by the fifth command.

13. An information processing system comprising:

a host; and a storage device connected to the host and capable of communicating with the host, based on a universal flash storage (UFS) standard, wherein the storage device includes a nonvolatile memory and a controller, the nonvolatile memory includes a plurality of memory cells each of which stores one or more bits of data, the controller is configured to:

write, in a first write mode, one bit of data to each of the plurality of memory cells, and write, in a second write mode, multiple bits of data to each of the plurality of memory cells; and manage a relationship between each of pieces of data stored in the nonvolatile memory and one of a plurality of tags each indicating a characteristic of data, the nonvolatile memory includes a swap area storing data that is not selected as an execution target of garbage collection triggered by the controller, is written in the first write mode, and corresponds to a first tag included in a write command received from the host, the host is configured to transmit, to the storage device, a first command to execute garbage collection, the first command including information designating, in a case where data is copied in the garbage collection, temperature of the copied data, the controller is configured to:

start the garbage collection in response to the first command received; and record progress of the garbage collection in accordance with the garbage collection in progress, the host is configured to transmit, to the storage device, a second command to confirm the progress, the controller is configured to notify the host of the progress in response to the second command received, the host is configured to transmit, to the storage device, a third command to execute an analysis relating to garbage collection for the host, the third command designating target storage areas of the analysis, the controller is configured to execute the analysis in response to the third command received, the host is configured to transmit, to the storage device, a fourth command to obtain results of the analysis, the controller is configured to notify the host of the results of the analysis in response to the fourth command received, the host is configured to transmit the first command to the storage device, based on the results of the analysis, the results are attribute information, and the results include a ratio of a total size of storage areas storing data to be copied in the garbage collection based on the first command compared to a total size of the target storage areas of the analysis.

14. A host configured to:

be connectable to a storage device;

transmit, to the storage device, a command to execute an analysis relating to garbage collection, the command designating target storage areas of the analysis;

obtain results of the analysis from the storage device; and based on the obtained results of the analysis, transmit, to the storage device, a first command to execute garbage collection, wherein the results are attribute information, and
the results include
a ratio of
a total size of storage areas storing data to be copied in the garbage collection based on the first command compared to a total size of the target storage areas of the analysis.

15. The information processing system according to claim 13, wherein
the controller is configured to:
execute processes of garbage collection;
update the attribute information in accordance with the executed processes of garbage collection; and
in response to the fourth command received, notify the host of the results of the analysis including the updated attribute information, and
the host is configured to transmit the first command to the storage device, based on the updated attribute information.

16. An information processing system comprising:
a host; and
a storage device connected to the host and capable of communicating with the host, based on a universal flash storage (UFS) standard, wherein
the storage device includes a nonvolatile memory and a controller,
the nonvolatile memory includes a plurality of memory cells each of which stores one or more bits of data,
the controller is configured to:
write, in a first write mode, one bit of data to each of the plurality of memory cells, and write, in a second write mode, multiple bits of data to each of the plurality of memory cells; and
manage a relationship between each of pieces of data stored in the nonvolatile memory and one of a plurality of tags each indicating a characteristic of data,
the nonvolatile memory includes a swap area storing data that is not selected as an execution target of garbage collection triggered by the controller, is written in the first write mode, and corresponds to a first tag included in a write command received from the host,
the host is configured to transmit, to the storage device, a first command to execute garbage collection,
the controller is configured to:
start the garbage collection in response to the first command received; and
record progress of the garbage collection in accordance with the garbage collection in progress,
the host is configured to transmit, to the storage device, a second command to confirm the progress,
the controller is configured to notify the host of the progress in response to the second command received,
the host is configured to transmit, to the storage device, a third command to execute an analysis relating to garbage collection for the host,
the controller is configured to execute the analysis in response to the third command received,
the host is configured to transmit, to the storage device, a fourth command to obtain results of the analysis,
the controller is configured to notify the host of the results of the analysis in response to the fourth command received,
the host is configured to transmit the first command to the storage device, based on the results of the analysis, and
the third command includes information designating a garbage collection mode for the first command to be transmitted based on the results of the analysis executed in accordance with the third command.

17. A host configured to:
be connectable to a storage device;
transmit, to the storage device, a command to execute an analysis relating to garbage collection;
obtain results of the analysis from the storage device; and
based on the obtained results of the analysis, transmit, to the storage device, a first command to execute garbage collection, wherein
the command includes information designating a garbage collection mode for the first command to be transmitted based on the results of the analysis executed in accordance with the command.

18. The host according to claim 17, wherein
the host is capable of communicating with the storage device, based on a universal flash storage (UFS) standard.

19. The host according to claim 17, wherein
the information designates, as the garbage collection mode, a first mode in which logically contiguous pieces of data managed by a file system of host software are contiguous in storage areas of a nonvolatile memory included in the storage device.

20. The host according to claim 19, wherein
in the garbage collection in the first mode, storage areas of the nonvolatile memory storing pieces of data that are not logically contiguous are determined as target storage areas of the garbage collection.

21. The host according to claim 20, wherein
the information designates, as the garbage collection mode, either the first mode or a second mode,
in the garbage collection in the second mode, a block with a low ratio of valid data is determined as a target storage area of the garbage collection with priority.

22. The host according to claim 14, wherein
the attribute information is updated in accordance with processes of garbage collection executed in the storage device;
the host is configured to:
transmit the command to the storage device;
obtain the results of the analysis including the updated attribute information, from the storage device; and
transmit the first command to the storage device, based on the updated attribute information.

* * * * *